United States Patent
Dorfinger et al.

(10) Patent No.: US 11,958,248 B2
(45) Date of Patent: Apr. 16, 2024

(54) COMPONENTS WITH GEOMETRICAL FEATURES TO FACILITATE POST-FABRICATION CLEANING

(71) Applicant: Align Technology, Inc., San Jose, CA (US)

(72) Inventors: Peter Dorfinger, Woodside, CA (US); Siobhan O'Leary, Santa Clara, CA (US); Yan Chen, Cupertino, CA (US); Zhou Yu, Fremont, CA (US); Jun Sato, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 160 days.

(21) Appl. No.: 17/530,346

(22) Filed: Nov. 18, 2021

(65) Prior Publication Data
US 2022/0152931 A1    May 19, 2022

Related U.S. Application Data

(60) Provisional application No. 63/183,926, filed on May 4, 2021, provisional application No. 63/115,275, filed on Nov. 18, 2020.

(51) Int. Cl.
| | |
|---|---|
| *B29C 64/00* | (2017.01) |
| *A61C 7/00* | (2006.01) |
| *A61C 7/08* | (2006.01) |
| *B29C 64/245* | (2017.01) |
| *B29C 64/35* | (2017.01) |
| *B29C 71/00* | (2006.01) |
| *B33Y 40/20* | (2020.01) |
| *B33Y 80/00* | (2015.01) |
| *B29L 31/00* | (2006.01) |

(52) U.S. Cl.
CPC .............. *B29C 64/35* (2017.08); *A61C 7/002* (2013.01); *A61C 7/08* (2013.01); *B29C 64/245* (2017.08); *B29C 71/0009* (2013.01); *B33Y 40/20* (2020.01); *B33Y 80/00* (2014.12); *B29C 2071/0027* (2013.01); *B29L 2031/753* (2013.01)

(58) Field of Classification Search
CPC ................................ B29C 64/35; B33Y 80/00
See application file for complete search history.

(56) References Cited

U.S. PATENT DOCUMENTS

| | | |
|---|---|---|
| 6,309,215 B1 | 10/2001 | Phan et al. |
| 6,450,807 B1 | 9/2002 | Chishti et al. |
| 6,497,574 B1 | 12/2002 | Miller |
| 6,626,666 B2 | 9/2003 | Chishti et al. |

(Continued)

FOREIGN PATENT DOCUMENTS

| | | |
|---|---|---|
| WO | 2019213585 A1 | 11/2019 |
| WO | 2019213588 A1 | 11/2019 |
| WO | 2020157598 A1 | 8/2020 |

*Primary Examiner* — Nicholas R Krasnow
(74) *Attorney, Agent, or Firm* — Lowenstein Sandler LLP

(57) ABSTRACT

The present application relates to components, such as dental apparatuses, having geometrical features to facilitate post-fabrication cleaning, including methods of fabricating the same. In one embodiment, a dental apparatus, such as a retainer, an aligner, or a dental attachment placement appliance, comprises one or more concave surfaces for which one or more apertures is formed therethrough at or near a maximum depth of a given concave surface.

14 Claims, 20 Drawing Sheets

(56) References Cited

U.S. PATENT DOCUMENTS

| | | |
|---|---|---|
| 6,705,863 B2 | 3/2004 | Phan et al. |
| 6,722,880 B2 | 4/2004 | Chishti et al. |
| 6,830,450 B2 | 12/2004 | Knopp et al. |
| 6,957,118 B2 | 10/2005 | Kopelman et al. |
| 6,976,627 B1 | 12/2005 | Culp et al. |
| 7,092,784 B1 | 8/2006 | Simkins |
| 7,192,273 B2 | 3/2007 | McSurdy, Jr. |
| 7,220,124 B2 | 5/2007 | Taub et al. |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,610,141 B2 | 4/2017 | Kopelman et al. |
| 9,844,424 B2 | 12/2017 | Wu et al. |
| 9,943,386 B2 | 4/2018 | Webber et al. |
| 9,943,991 B2 | 4/2018 | Tanugula et al. |
| 10,213,277 B2 | 2/2019 | Webber et al. |
| 10,336,102 B2 | 7/2019 | Cole |
| 10,363,116 B2 | 7/2019 | Boronkay |
| 10,492,888 B2 | 12/2019 | Chen et al. |
| 10,495,973 B2 | 12/2019 | Cole |
| 10,783,629 B2 | 9/2020 | Parpara et al. |
| 10,888,395 B2 | 1/2021 | Kopelman |
| 11,189,021 B2 | 11/2021 | Shah et al. |
| 11,295,444 B2 | 4/2022 | Cherkas et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2010/0239992 A1 | 9/2010 | Brandt et al. |
| 2015/0238280 A1 | 8/2015 | Wu et al. |
| 2016/0310236 A1 | 10/2016 | Kopelman et al. |
| 2017/0007365 A1 | 1/2017 | Kopelman et al. |
| 2017/0007366 A1 | 1/2017 | Kopelman et al. |
| 2017/0007368 A1 | 1/2017 | Boronkay |
| 2017/0165032 A1 | 6/2017 | Webber et al. |
| 2017/0319296 A1 | 11/2017 | Webber et al. |
| 2019/0240924 A1* | 8/2019 | Hendrik ................ B33Y 40/20 |
| 2019/0298494 A1* | 10/2019 | Webber ................ A61C 7/145 |
| 2019/0321136 A1 | 10/2019 | Martz et al. |
| 2020/0078137 A1 | 3/2020 | Chen et al. |
| 2020/0130237 A1 | 4/2020 | Mojdeh et al. |
| 2020/0198242 A1* | 6/2020 | John ................ B29C 64/35 |
| 2020/0214801 A1 | 7/2020 | Wang et al. |
| 2020/0290262 A1 | 9/2020 | Aguilar Mendez et al. |
| 2020/0306017 A1 | 10/2020 | Chavez et al. |
| 2020/0316856 A1 | 10/2020 | Mojdeh et al. |
| 2020/0337813 A1* | 10/2020 | Kirchner ................ B33Y 30/00 |
| 2021/0017302 A1* | 1/2021 | Cheng ................ C08F 220/56 |
| 2021/0030516 A1 | 2/2021 | O'Leary et al. |

\* cited by examiner

500

Fabricate a dental apparatus from a resin using an additive fabrication process
510

Orient the dental apparatus on a rotor of a centrifuge chamber such that concave surfaces of the dental apparatus substantially face a center of mass of the rotor
520

Centrifuge the dental apparatus using parameters sufficient to remove residual resin from surfaces thereof
530

Clean the dental apparatus with a solvent to further remove residual resin
540

FIG. 5

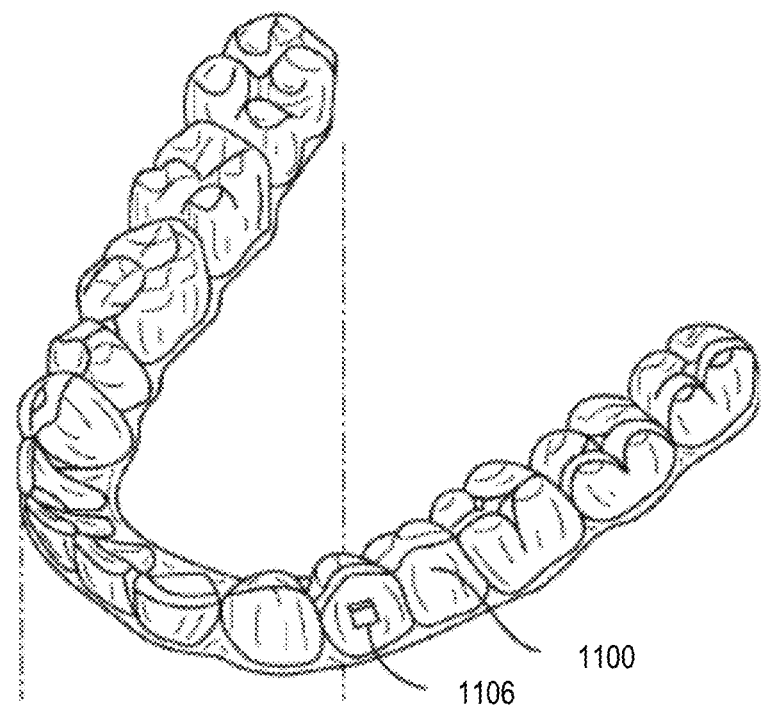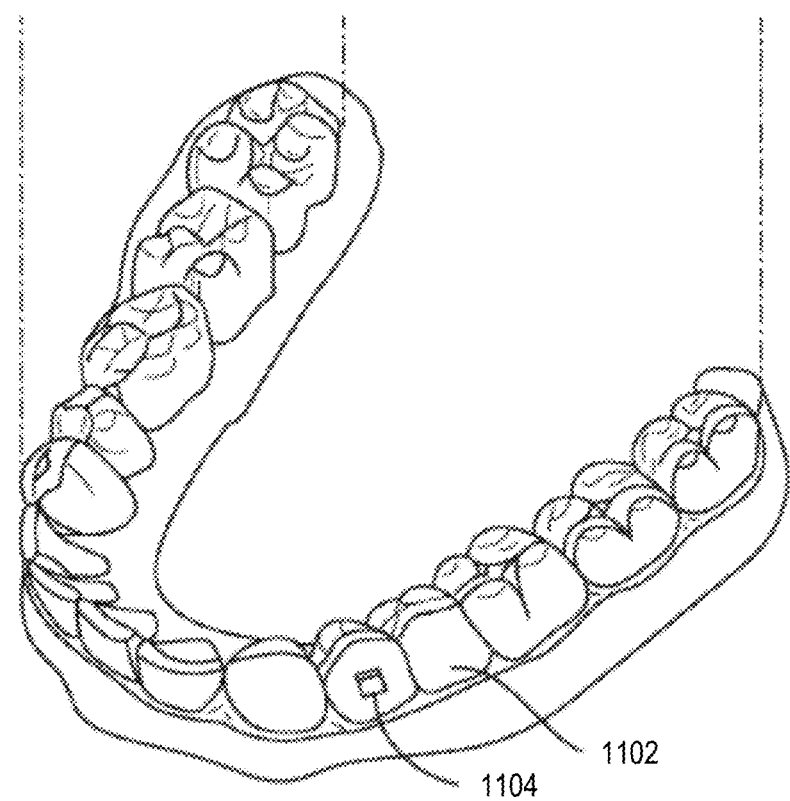
FIG. 11A

COMPONENTS WITH GEOMETRICAL FEATURES TO FACILITATE POST-FABRICATION CLEANING

CROSS-REFERENCE TO RELATED APPLICATION(S)

This application claims the benefit of priority of U.S. Provisional Patent Application No. 63/115,275, filed on Nov. 18, 2020, and of U.S. Provisional Patent Application No. 63/183,926, filed on May 4, 2021, the disclosures of which are hereby incorporated by reference herein in their entireties.

TECHNICAL FIELD

Embodiments of the present disclosure relate to fabrication of additively manufactured parts and, in particular, to the fabrication of medical appliances such as dental appliances.

BACKGROUND

Stereolithography three-dimensional (3D) printing is a method of producing dental apparatuses from a resin material. During fabrication, some of the resin used to 3D print an item may not cure. It may remain in a liquid state as residual resin. Residual resin from a fabrication process can be removed via centrifugation and/or other techniques to separate portions of an item having different states (e.g., solid and liquid), densities, and/or viscosities. However, resin can still pool on various regions, including cavities where liquids can collect. It may be difficult to remove resin pools despite the use of techniques (e.g., centrifugation) to separate the various portions of a 3D printed item.

Many conventional techniques involve the use of solvents to clean resin pools that form on items. While these techniques are potentially useful, it may be desirable to remove liquid from a 3D printed item before applying solvents to the item. Removing liquid resin from a 3D printed part with reduced solvent use may reduce costs and may speed up fabrication times. For industrial processes that involve mass manufacture of additively fabricated items, these cost reductions can be significant and can define a product's viability in the market. As an example, for an industrial process that involves mass manufacture of dental appliances, removing liquid from a 3D printed item can significantly reduce cost/solvent use, and can speed up the manufacturing process.

Many conventional 3D printed items include supports that support a body and are printed on a build plate. During fabrication, uncured resin can form liquid pools on parts of the body. As an example, uncured resin can pool on concave regions of an additively manufactured item. As an example in the dental context, uncured resin can form liquid pools on occlusal, buccal, lingual surfaces of various additively manufactured items such as: 3D printed molds used to thermoform aligners, 3D printed aligners, 3D printed attachment formation templates (including those with 3D printed and/or prefabricated attachments), 3D printed palatal expanders, 3D printed retainers, etc. As another example in the dental context, uncured resin can form liquid pools on the palatal surfaces of various additively manufactured items such as: 3D printed palatal expanders, 3D printed retainers, etc. Centrifugation of conventional 3D printed items often fails to remove liquid pools of resin from areas where resin is likely to collect. As noted herein, solvents can be expensive, particularly in mass manufacture processes. It may be desirable to have items that are 3D printed with removal of liquid resin pools in mind.

SUMMARY

In accordance with at least one aspect of the present disclosure, a method of forming a dental apparatus includes fabricating the dental apparatus from a resin using an additive fabrication process. In at least one embodiment, the dental apparatus includes a frame shaped to extend over at least a portion of a dental arch; and a plurality of concave surfaces disposed along the frame. In at least one embodiment, one or more of the concave surface comprises an aperture formed therethrough. In at least one embodiment, the method further includes centrifuging the dental apparatus using parameters sufficient to remove residual resin from surfaces of dental apparatus resulting from the additive fabrication process. In at least one embodiment, each aperture provides a flow path for the residual resin during the centrifugation so as to reduce or eliminate pooling of the residual resin on a respective concave surface of the dental apparatus.

In some embodiments, a novel and inventive dental appliance comprises a set of additively manufactured layers. Additively manufactured layers, as used herein, can include layers formed by three-dimensional (3D) printing/additive manufacturing. 3D printing or "additive manufacturing," as used herein, can refer to a variety of processes in which material is deposited, joined, or solidified under computer control to create a 3D object with material being added together in a layer by layer manner. Additive manufacture can include rapid prototyping, e.g., techniques to build prototypes of items, mass manufacturing, e.g., industrial processes to build items at scale for consumer and/or other purposes.

As noted herein, the dental appliance may include a first surface that is coupled to a build plate with additively manufactured supports. The dental appliance may also include a second surface that is opposite the first surface and is on another side of the dental appliance than the additively manufactured supports. The first surface may include cavities, such as: tooth-receiving shaped to receive teeth and reposition teeth from a first arrangement toward a second arrangement; tooth-receiving cavities shaped to receive and/or retain teeth; cavities used to position, secure, and/or retain a pre-fabricated attachment template and/or additively manufactured attachments to teeth; cavities corresponding to palatal and/or lingual anatomy for retainers or palatal expanders, etc. As noted herein, one or more apertures may connect cavities on the first surface to the second surface. These apertures may have a variety of sizes and/or geometries as noted herein. These apertures may direct the flow of uncured resin when forces are applied in a direction parallel to the additively manufactured supports. As an example, the dental appliance supports, and a build plate may be put into a centrifuge. Centrifugal forces may direct uncured liquid resin that resides on the cavities of the first surface through the apertures toward the second surface. Liquid resin may be collected and/or reused/disposed of. These dental appliances can save solvent (and reduce costs) and can also help collect uncured liquid resin for reuse/disposal. Examples of dental appliances include additively manufactured aligners, additively manufactured prefabricated attachment templates, additively manufactured retainers, additively manufactured aligner molds used to thermoform aligners, additively manufactured palatal expanders (e.g., incremental palatal expanders), etc.

In at least one embodiment, the dental apparatus is in condition for use in a dental procedure without an intermediate solvent-based cleaning step after the centrifuging and before the use in the dental procedure.

In at least one embodiment, the method further includes cleaning the dental apparatus with a solvent to further remove residual resin not removed by the centrifuging, such that an amount of solvent used is less than an amount of solvent sufficient for cleaning a similar dental apparatus that does not have any apertures through any concave surfaces.

In at least one embodiment, the method further includes orienting the dental apparatus on a rotor of a centrifuge chamber such that the plurality of concave surfaces are substantially facing a center of mass of the rotor during the centrifuging.

In at least one embodiment, at least one aperture is in a form of a round aperture, an elliptical aperture, or a mesh.

In at least one embodiment at least one of the concave surfaces comprises two or more apertures formed therethrough.

In at least one embodiment, at least one of the concave surfaces comprising an aperture further comprises at least one channel formed therein that is radially oriented with respect to the aperture, such that the at least one channel facilitates flow of the residual resin toward the aperture.

In at least one embodiment, a maximum diameter of at least one aperture is from about 0.5 millimeters to about 5 millimeters.

In at least one embodiment, the dental apparatus is formed from a polymer selected a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, and a combination thereof.

In at least one embodiment, the dental apparatus is a dental attachment placement appliance, such that the plurality of concave surfaces are configured to engage teeth along the dental arch. In at least on embodiment, the dental attachment placement appliance includes a plurality of dental attachment components configured to contact buccal surfaces of the teeth. In at least one embodiment, each dental attachment component is frangibly connected to the frame.

In accordance with at least another aspect of the present disclosure, a dental apparatus includes: a frame shaped to extend over at least a portion of a dental arch; a plurality of concave surfaces disposed along the frame, each concave surface being configured to engage a tooth along the dental arch, such that one or more of the concave surfaces comprises an aperture formed therethrough at or near a maximum depth of the concave surface; and a plurality of dental attachment components frangibly coupled to the frame.

In at least one embodiment, at least one aperture is in a form of a round aperture, an elliptical aperture, or a mesh.

In at least one embodiment, at least one of the concave surfaces comprises two or more apertures formed therethrough.

In at least one embodiment, at least one of the concave surfaces comprising an aperture further comprises at least one channel formed therein that is radially oriented with respect to the aperture, such the at least one channel facilitates flow of the residual resin toward the aperture.

In at least one embodiment, a maximum diameter of at least one aperture is from about 0.5 millimeters to about 5 millimeters.

In at least one embodiment, the dental apparatus is formed from a polymer selected from a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, and a combination thereof.

In at least one embodiment, the dental apparatus is a dental attachment placement appliance, such that each dental attachment portion is configured to contact a buccal surfaces of a tooth along the dental arch.

In at least one embodiment, each dental attachment portion is frangibly coupled to the frame by at least one strut.

In at least another aspect of the present disclosure, a method of modifying a three-dimensional model representative of a dental apparatus includes: identifying, within the three-dimensional model, a plurality of concave surfaces that are likely to accumulate fluid when the dental apparatus, after fabrication, is subjected to a centrifugation process; and for each identified concave surface, generating an aperture that passes through the concave surface, the method further includes transmitting data descriptive of the three-dimensional model to a fabrication device to produce the dental apparatus using an additive fabrication process.

In at least one embodiment, identifying the plurality of concave surfaces includes: identifying surfaces corresponding to regions that contact regions of a patient's teeth.

In at least one embodiment, generating the aperture includes positioning the aperture at a location of the concave surface having the greatest depth.

In at least one embodiment, identifying the plurality of concave surfaces includes computing a point representative of a center of mass of a rotor based on an estimated position and orientation of the dental apparatus when fabricated and mounted within a centrifuge chamber; computing a depth map of an outer surface of the three-dimensional model relative to the point representative of the center of mass; identifying, within the depth map, at least one local minimum; and selecting, as the plurality of concave surfaces, portions of the outer surface of the three-dimensional on which the at least one local minimum is located.

In at least one embodiment, at least one aperture is in a form of a round aperture, an elliptical aperture, or a mesh.

In at least one embodiment, the method further includes, for at least one identified concave surface, generating two or more apertures that pass through the at least concave surface.

In at least one embodiment, the method further includes, for at least one identified concave surface, generating an aperture and at least one channel that is radially oriented with respect to the aperture.

In at least one embodiment, a maximum diameter of at least one aperture is from about 0.5 millimeters to about 5 millimeters after the dental apparatus is produced.

In accordance with at least one aspect of the present disclosure, a method of forming a dental apparatus includes fabricating the dental apparatus from a resin using an additive fabrication process. In at least one embodiment, a method comprises: fabricating the dental apparatus from a resin using an additive fabrication process. In some embodiments, the dental apparatus comprises: a body shaped to contact and conform to at least a portion of a dental arch; and one or more concave surfaces disposed along the body. In at least one embodiment, at least one of the one or more of the concave surfaces comprises an aperture formed therethrough. In at least one embodiment, the method further comprises centrifuging the dental apparatus using parameters sufficient to remove residual resin from surfaces of the dental apparatus resulting from the additive fabrication process. In at least one embodiment, each aperture provides a flow path for the residual resin during the centrifugation so as to reduce or eliminate pooling of the residual resin on a respective concave surface of the dental apparatus.

In at least one embodiment, the dental apparatus is in condition for use in a dental procedure without an intermediate solvent-based cleaning step after the centrifuging and before the use in the dental procedure.

In at least one embodiment, the method further comprises cleaning the dental apparatus with a solvent to further remove residual resin not removed by the centrifuging. In at least one embodiment, an amount of solvent used is less than an amount of solvent sufficient for cleaning a similar dental apparatus that does not have any apertures through any concave surfaces.

In at least one embodiment, the method further comprises orienting the dental apparatus on a rotor of a centrifuge chamber such that the one or more concave surfaces are substantially facing a center of mass of the rotor during the centrifuging.

In at least one embodiment, the dental apparatus is attached to a build plate used for fabricating the dental apparatus during the centrifuging.

In at least one embodiment, centrifuging the dental apparatus comprises: arranging the dental apparatus and build plate such that, during the centrifuging, a normal direction of the build plate is oriented substantially parallel to a radial direction that passes through a center of mass of a centrifuge rotor.

In at least one embodiment, centrifuging the dental apparatus comprises: arranging the dental apparatus and build plate such that, during the centrifuging, a normal direction of the build plate is oriented at a non-zero angle with respect to a radial axis that passes through a center of mass of a centrifuge rotor.

In at least one embodiment, the non-zero angle is from about 10° to about 35°.

In at least one embodiment, at least one aperture is in a form of a round aperture, an elliptical aperture, or a mesh.

In at least one embodiment, at least one of the concave surfaces comprises two or more apertures formed therethrough.

In at least one embodiment, at least one of the concave surfaces comprising an aperture further comprises at least one channel formed therein that is radially oriented with respect to the aperture. In at least one embodiment, the at least one channel facilitates flow of the residual resin toward the aperture.

In at least one embodiment, a maximum diameter of at least one aperture is from about 0.5 millimeters to about 5 millimeters.

In at least one embodiment, the dental apparatus is formed from a polymer selected from a group consisting of a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, and a combination thereof.

In at least one embodiment, the dental apparatus is a retainer. In at least one embodiment, the one or more concave surfaces are configured to engage the dental arch. In at least one embodiment, the retainer comprises at least one aperture formed through a concave surface in a central region of the retainer.

In at least one embodiment, the dental apparatus is an aligner. In at least one embodiment, one or more concave surfaces are configured to engage teeth along the dental arch. In at least one embodiment, the aligner comprises at least one aperture formed through a concave surface shaped to substantially conform to a tooth when worn by a patient.

In at least one embodiment, a dental apparatus comprises: one or more concave surfaces that are configured to engage a dental arch of a patient. In at least one embodiment, the dental apparatus comprises at least one aperture located at and formed through the one or more concave surfaces.

The In at least one embodiment, the dental apparatus is a retainer.

In at least one embodiment, the dental apparatus is an aligner.

In at least one embodiment, the at least one aperture is in a form of a round aperture, an elliptical aperture, or a mesh.

In at least one embodiment, at least one of the concave surfaces comprises two or more apertures formed therethrough.

In at least one embodiment, at least one of the concave surfaces comprising an aperture further comprises at least one channel formed therein that is radially oriented with respect to the aperture. In at least one embodiment, the at least one channel facilitates flow of residual resin toward the aperture.

In at least one embodiment, a maximum diameter of at least one aperture is from about 0.5 millimeters to about 5 millimeters.

In at least one embodiment, the dental apparatus is formed from a polymer selected from a group consisting of a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, and a combination thereof.

In at least one embodiment, the dental apparatus is fabricated from a resin using an additive manufacturing process.

In at least one embodiment, a method of modifying a three-dimensional model representative of a dental apparatus comprises: identifying, within the three-dimensional model, a plurality of concave surfaces that are likely to accumulate fluid when the dental apparatus, after fabrication, is subjected to a centrifugation process; and for each identified concave surface, generating an aperture that passes through the concave surface. In at least one embodiment, a diameter of the aperture is computed based at least partially on one or more of a resin viscosity, a resulting change in structural stiffness of the dental apparatus, a surface area of the concave surface through which the aperture is to be formed, or a centrifugal force to be applied during cleaning of the dental apparatus after fabrication.

In at least one embodiment, the method further comprises: transmitting data descriptive of the three-dimensional model to a fabrication device to produce the dental apparatus using an additive fabrication process.

In at least one embodiment, identifying the plurality of concave surfaces comprises: identifying surfaces corresponding to regions that contact regions of a patient's teeth or palate.

In at least one embodiment, generating the aperture comprises positioning the aperture at a location of a concave surface of the plurality of concave surfaces having a greatest depth.

In at least one embodiment, the method further comprises: for at least one identified concave surface, generating two or more apertures that pass through the at least one identified concave surface.

In at least one embodiment, the method further comprises: for at least one identified concave surface, generating an aperture and at least one channel that is radially oriented with respect to the aperture.

In at least one embodiment, a maximum diameter of at least one aperture is from about 0.5 millimeters to about 5 millimeters after the dental apparatus is produced.

In accordance with at least another aspect of the present disclosure, a dental appliance comprises: a first plurality of additively manufactured layers; one or more engagement surfaces formed from the first plurality of additively manufactured layers; a first surface formed from the first plurality of additively manufactured layers; a second surface formed from the first plurality of additively manufactured layers, the second surface being opposite the first surface; and one or more apertures formed through the first plurality of additively manufactured layers of the dental appliance from the one or more cavities on the first surface to the second surface. In at least one embodiment, the one or more engagement surfaces are shaped to engage with at least a portion of a patient's dentition and to implement at least a portion of a treatment plan on the patient's dentition. In at least one embodiment, the first surface includes one or more cavities and the first surface is configured to interface with a plurality of additively manufactured supports to couple the dental appliance to a build plate. In at least one embodiment, the plurality of additively manufactured supports comprises a second plurality of additively manufactured layers.

In at least one embodiment, the dental appliance comprises an aligner.

In at least one embodiment, the dental appliance comprises a prefabricated attachment template.

In at least one embodiment, the dental appliance comprises a retainer.

In at least one embodiment, the dental appliance comprises an aligner mold.

In at least one embodiment, the dental appliance comprises an incremental palatal expander.

In at least one embodiment, the first surface comprises a first occlusal surface of the dental appliance and the second surface comprises a second occlusal surface of the dental appliance.

In at least one embodiment, the first surface comprises a first occlusal surface of the dental appliance and the second surface comprises a second occlusal surface of the dental appliance; and the dental appliance comprises an aligner.

In at least one embodiment, the first surface comprises a first occlusal surface of the dental appliance and the second surface comprises a second occlusal surface of the dental appliance; and the dental appliance comprises a prefabricated attachment template.

In at least one embodiment, the first surface comprises a first buccal surface of the dental appliance and the second surface comprises a second buccal surface of the dental appliance.

In at least one embodiment, the first surface comprises a first buccal surface of the dental appliance and the second surface comprises a second buccal surface of the dental appliance; and the dental appliance comprises an aligner.

In at least one embodiment, the first surface comprises a first buccal surface of the dental appliance and the second surface comprises a second buccal surface of the dental appliance; and the dental appliance comprises a prefabricated attachment template.

In at least one embodiment, the first surface is configured to interface with the patient's tongue and the second surface is configured to engage the patient's palate.

In at least one embodiment, the first surface is configured to interface with the patient's tongue and the second surface is configured to engage the patient's palate; and the dental appliance comprises a palatal expander.

In at least one embodiment, the first surface is configured to interface with the patient's tongue and the second surface is configured to interface with the patient's palate; and the dental appliance comprises a retainer.

In at least one embodiment, the second surface comprises a palatal surface of the dental appliance; and the dental appliance comprises an aligner mold.

In at least one embodiment, the one or more cavities comprise one or more surface regions having concave features; and the one or more apertures reside over one or more local minima characterizing the one or more surface regions.

In at least one embodiment, the one or more cavities comprise one or more surface regions having concave features; and the one or more apertures reside over one or more first portions of the one or more surface regions having a surface gradient less than one or more second portions of the one or more surface regions.

In at least one embodiment, the one or more apertures comprise a cross-section having an elliptical shape.

In at least one embodiment, the one or more apertures comprise a cross-section having a circular shape.

In at least one embodiment, the one or more apertures are formed through a palatal region of the dental appliance; and the one or more apertures comprise a cross-section having an elliptical or circular shape.

In at least one embodiment, the one or more apertures are formed through a buccal-lingual region of the dental appliance; and the one or more apertures comprise a cross-section having an elliptical or circular shape.

In at least one embodiment, the one or more apertures are formed through an occlusal region of the dental appliance; and the one or more apertures comprise a cross-section having an elliptical or circular shape.

In at least one embodiment, the one or more apertures comprise a cross-section characterized by a plurality of angles inclined toward a coronal surface of the patient's teeth.

In at least one embodiment, the one or more apertures are formed through a buccal-lingual surface of the dental appliance; and the one or more apertures comprise a cross-section characterized by a plurality of angles inclined toward a coronal surface of the patient's teeth.

In at least one embodiment, sizes of the one or more apertures are based on a viscosity of a resin used to additively manufacture the dental appliance.

In at least one embodiment, sizes of the one or more apertures are based on a print resolution of a 3D printer used to additively manufacture the dental appliance.

In at least one embodiment, sizes of the one or more apertures are based on a viscosity of a resin used to additively manufacture the dental appliance, a print resolution of a 3D printer used to additively manufacture the dental appliance, one or more centrifugal forces of a centrifuge configured to process the dental device, or some combination thereof.

In at least one embodiment, the dental appliance further comprises the plurality of additively manufactured supports.

In at least one embodiment, the plurality of additively manufactured supports comprise a plurality of additively manufactured columns configured to support the dental appliance on a build plate.

In at least one embodiment, the plurality of additively manufactured supports are oriented toward a build plate and the one or more apertures are oriented perpendicular to the plurality of additively manufactured supports.

In at least one embodiment, the dental appliance further comprising uncured liquid resin residing within the one or more cavities.

In at least one embodiment, the first surface comprises one or more channels having concave features, and the one or more apertures reside in the one or more channels.

In at least one embodiment, the one or more apertures comprise at least one large aperture and a plurality of small apertures. In at least one embodiment, the plurality of small apertures are smaller than the at least one large aperture.

In at least another aspect of the present disclosure, a dental appliance comprises: a first plurality of additively manufactured layers; one or more engagement surfaces formed from the first plurality of additively manufactured layers; a first surface formed from the first plurality of additively manufactured layers; a second surface formed from the first plurality of additively manufactured layers, the second surface being opposite the first surface; and one or more apertures formed through the first plurality of additively manufactured layers of the dental appliance from the first surface to the second surface. In at least one embodiment, the one or more engagement surfaces are shaped to engage with at least a portion of a patient's dentition and to implement at least a portion of a treatment plan on the patient's dentition. In at least one embodiment, the first surface includes one or more cavities and the first surface is configured to interface with a plurality of additively manufactured supports to couple the dental appliance to a build plate. In at least one embodiment, the plurality of additively manufactured supports comprises a second plurality of additively manufactured layers. In at least one embodiment, the one or more apertures are configured to direct residual liquid resin on the one or more cavities from the first surface toward the second surface when a force is applied in a direction parallel to the one or more additively manufactured supports.

In at least one embodiment, the force comprises a centrifugal force from a centrifuge.

In at least another aspect of the present disclosure, a dental appliance comprises: a first plurality of additively manufactured layers; one or more engagement surfaces formed from the first plurality of additively manufactured layers; a first surface formed from the first plurality of additively manufactured layers; a second surface formed from the first plurality of additively manufactured layers, the second surface being opposite the first surface; and means for directing residual liquid resin on the one or more cavities from the one or more cavities on the first surface toward the second surface when a force is applied in a direction parallel to the one or more additively manufactured supports. In at least one embodiment, the one or more engagement surfaces are shaped to engage with at least a portion of a patient's dentition and to implement at least a portion of a treatment plan on the patient's dentition. In at least one embodiment, the first surface includes one or more cavities and the first surface is configured to interface with a plurality of additively manufactured supports to couple the dental appliance to a build plate. In at least one embodiment, the plurality of additively manufactured supports comprises a second plurality of additively manufactured layers.

In at least another aspect of the present disclosure, a computer-implemented method comprises: obtaining a virtual model of a patient's dentition; identifying properties of dental appliance comprising: one or more engagement surfaces shaped to engage with at least a portion of a patient's dentition and to implement at least a portion of a treatment plan on the patient's dentition, a first surface including one or more cavities to be additively manufactured, and a second surface to be additively manufactured and opposite the first surface; identifying properties of a plurality of additively manufactured supports configured to couple the first surface to a build plate; identifying one or more apertures to form through the dental appliance from the one or more cavities on the first surface to the second surface; and providing instructions to additively manufacture a plurality of layers comprising the one or more engagement surfaces, the first surface, the second surface, the additively manufactured supports, and the apertures.

In at least one embodiment, the method further comprises using the instructions to additively manufacture the plurality of layers to cure liquid resin to form the one or more engagement surfaces, the first surface, the second surface, the additively manufactured supports, and the apertures.

In at least one embodiment, the method further comprises: using the instructions to additively manufacture the plurality of layers to cure liquid resin to form the one or more engagement surfaces, the first surface, the second surface, the additively manufactured supports, and the apertures; and instructing a centrifuge to apply centrifugal forces to the dental appliance to remove residual resin from the one or more cavities through the apertures.

BRIEF DESCRIPTION OF THE DRAWINGS

Embodiments of the present disclosure are illustrated by way of example, and not by way of limitation, in the figures of the accompanying drawings.

FIG. 5 is an example flow diagram illustrating a method of forming a dental apparatus in accordance with at least one embodiment.

FIG. 11A illustrates a tooth repositioning appliance, in accordance with embodiments.

DETAILED DESCRIPTION

Figure 1:
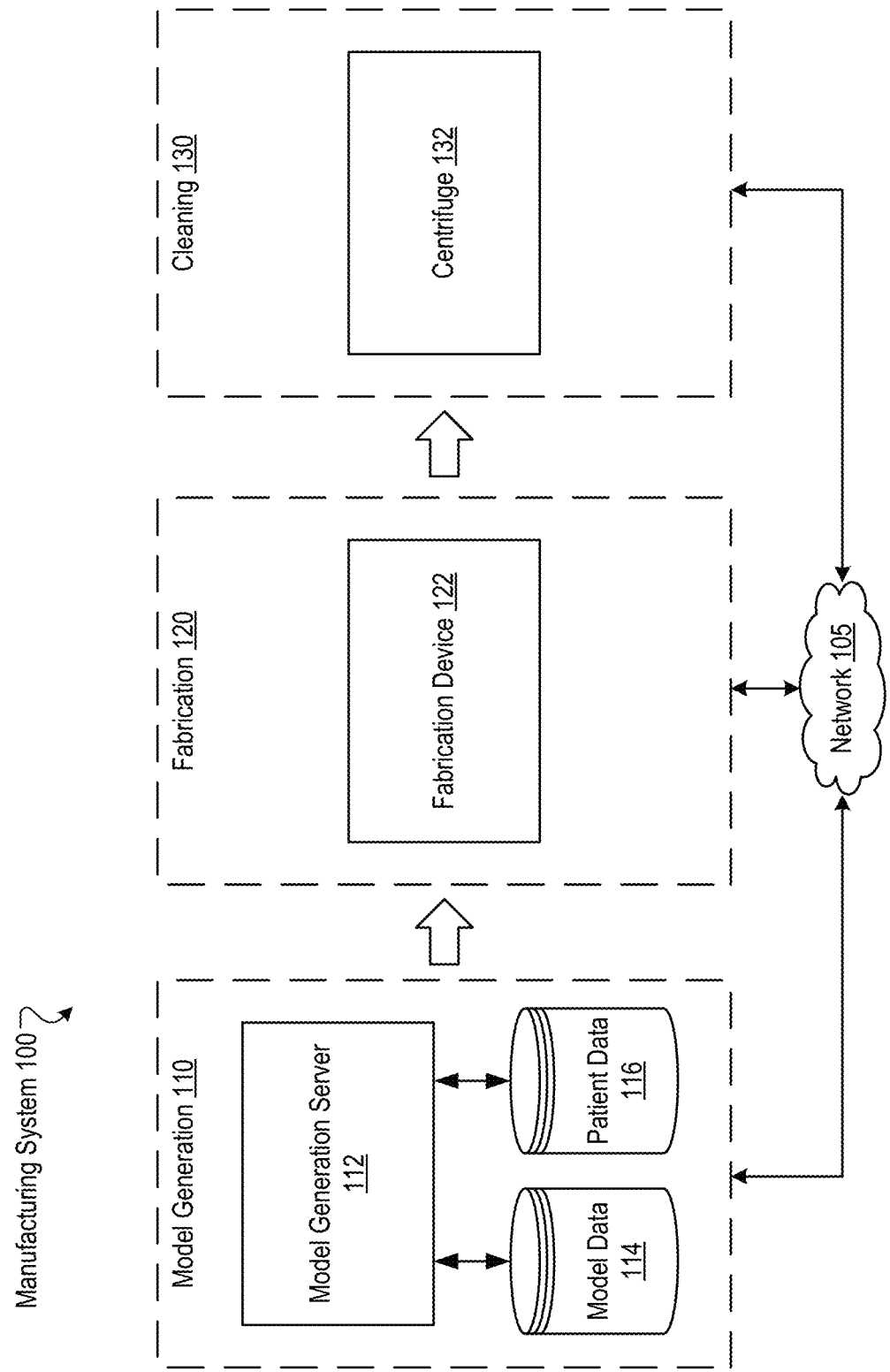
FIG. 1 illustrates an exemplary manufacturing system for fabricating a dental apparatus and preparing it for use in accordance with at least one embodiment.

Described herein are components, such as dental apparatuses (e.g., dental placement appliances, orthodontic appliances, retainers, aligners, and the like), with geometrical features that facilitate post-fabrication cleaning, as well as methods of fabricating the same. Specifically, in some embodiments, a dental apparatus may be fabricated to include apertures, channels, and/or other shapes that facilitate drainage of residual resins that collect on the surfaces of the apparatus during a centrifugal-based cleaning process.

Cleaning of apparatuses fabricated via additive manufacturing processes, such as 3D printing, is performed before post-curing to improve geometrical accuracy and performance of the final products. Centrifugation can be used to remove residual resin (e.g., photopolymeric resin), allowing the resin to be recycled and re-used. Solvent washing is typically used for thorough cleaning, following centrifugation. The more resin that can be removed in the centrifuging step, the less resin will be dissolved or washed into the solvent.

The apparatus and its build plate/tray from the additive manufacturing process are mounted within the centrifuge and are oriented such that the apparatus and its build plate face toward a center of mass of the centrifuge rotor such that the build plate prevents detachment of the apparatus. During centrifugation, the residual resin will be pushed away radially from the center of mass and flow off of the apparatus. However, regions of the apparatus that include cavities may collect and trap some of the residual resin, which will remain present on the apparatus after centrifugation. In such instances, further solvent-based cleaning of the apparatus is required to remove the residual resin. While further centrifugation could be utilized to further remove the residual resin, this would require more fabrication time and may cause distortion of the apparatus.

Embodiments of the present disclosure minimize resin consumption and residual resin after fabrication of apparatuses by utilizing geometrical features that allow for residual resin to empty from cavities during centrifugation. This results in a more efficient cleaning by either eliminating the need for solvent-based cleaning (and thus eliminating a cleaning step) or by reducing the volume of solvent needed to clean the apparatus. In some embodiments, geometrical features are relatively small (e.g., having maximum dimensions of less than about 5 mm) and can be located at regions for which resin accumulation is predicted to occur (e.g., concave surfaces, such as those that may be facing a centrifuge rotor's center of mass during centrifugation), thus preserving the function of the surfaces of the apparatus and the overall structural rigidity of the apparatus. In some embodiments, structural features, such as lattice structures at various locations of the apparatus, could be used to reduce a total amount of resin consumption during fabrication. In some embodiments, the sizes and/or shapes of the structural features may be determined based on one or more of a viscosity/flowability of the resin used, a resulting or estimated change in structural stiffness of the dental apparatus, a surface area of the concave surface available for forming the structural feature, or a centrifugal force and/or centrifugation time at which the apparatus is to be cleaned.

Advantages of the embodiments of the present disclosure include, but are not limited to: improved cleaning efficiency of centrifugation; reduction or elimination of solvent needed for cleaning apparatuses prior to use, reducing the possibility of deforming the apparatus; reduction in solvent disposal requirements; elimination of a processing step in manufacturing dental apparatuses; reduction in the amount of resin needed for additive fabrication; reduced possibility of apparatus distortion due to centrifugation steps; reduced centrifugation time; and reduced overall fabrication and processing time.

In some embodiments, the techniques used herein can be used to form aligners and/or series of aligners. An aligner, as used herein, can include a directly fabricated dental apparatus having a plurality of cavities shaped to resiliently reposition teeth from a first arrangement toward a target arrangement. Aligners can be formed alone or in a series to incrementally reposition teeth. Examples can be found in: U.S. Pat. No. 6,722,880 to inventors Chishti et al., entitled, "Method and system for incrementally moving teeth;" U.S. Pat. No. 6,705,863 to inventors Phan et al., entitled, "Attachment devices and methods for a dental appliance;" and U.S. Pat. No. 6,626,666 to Chishti et al., entitled, "Method and system for incrementally moving teeth."

In some embodiments, the techniques used herein can be used to form dental attachment placement appliances for facilitating the attachment of a dental attachment to a patient's teeth. The dental attachment placement appliance (also referred to herein as a "placement appliance" or "dental placement appliances") helps to avoid errors associated with manual application of dental attachments, such as mismatch between the position and/or orientation of the dental attachment in relation to the patient's teeth, which can reduce the effectiveness of or render ineffective the dental attachment. Use of a placement appliance includes several benefits including, but not limited to, improved accuracy of placement of dental attachments to tooth surfaces, improved patient experience, and more efficient manufacturing. Exemplary dental attachment placement appliances are described in greater detail in U.S. Patent Application Publication No. 2019/0298494 A1, which is hereby incorporated by reference as if set forth fully herein. Additional examples of placement appliances can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" the contents of U.S. patent application Ser. No. 16/366,686 by inventors Webber et al., entitled "Dental attachment placement structure;" as well as any continuation or divisional application claiming priority and any utility or provisional application to which these claim priority therefrom. These patents/applications are hereby incorporated by reference as if set forth fully herein. Although various embodiments described herein are with respect to placement appliances, it should be understood that these various embodiments are applicable to other types of dental apparatuses. Moreover, the geometrical features described and the methods by which surfaces are identified for placement of such geometrical features may also be utilized in other components formed from additive manufacturing processes, particularly those where centrifugation is used for residual resin removal.

In some embodiments, the techniques herein can be used to form molds, such as thermoforming molds used in turn to form aligners. Examples of these can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds;" as well as any continuation or divisional application claiming priority and any utility or provisional application to which these claim priority therefrom. These patents/applications are hereby incorporated by reference as if set forth fully herein.

In some embodiments, the techniques herein can be used to form appliances with mandibular repositioning features. Examples of these can be found in: U.S. Pat. No. 9,844,424 by inventors Wu et al., entitled, "Dental appliance with repositioning jaw elements;" U.S. Pat. Pub. No. 2015/0238280 by inventors Wu et al., entitled "Dental appliance with repositioning jaw elements;" U.S. Pat. No. 10,213,277 by inventors Webber et al., entitled "Dental appliance binding structure;" as well as any continuation or divisional application claiming priority and any utility or provisional application to which these claim priority therefrom. These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" U.S. Pat. No. 7,874,836 by inventor McSurdy entitled "System and method for palatal expansion;" as well as any continuation or divisional application claiming priority and any utility or provisional application to which these claim priority therefrom. These patents/applications are hereby incorporated by reference as if set forth fully herein.

In some embodiments, the techniques herein can be used to form directly fabricated aligners. Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App. Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopelman et al., entitled "Direct fabrication of aligners for arch expansion;" U.S. Pat. App. Pub. No. 2017/0007367 to Li et al., entitled "Direct fabrication of palate expansion and other application;" as well as any continuation or divisional application claiming priority and any utility or provisional application to which these claim priority therefrom. These patents/applications are hereby incorporated by reference as if set forth fully herein.

In some embodiments, the techniques herein can be used to form restorative dental appliances, such as bridges, crowns, dentures, etc. It is noted the techniques herein can be used to form any combination of aligners, molds, palatal expanders, appliances with mandibular repositioning elements, restorative dental appliances, etc.

FIG. 1 illustrates an exemplary manufacturing system 100 for fabricating a dental apparatus and preparing it for use in accordance with at least one embodiment. The manufacturing system 100 depicts components arranged in a cascading process that includes three stages: model generation 110, fabrication 120, and cleaning 130. Model generation 110 utilizes a model generation server 112, model data 114, and/or patient data 116. Fabrication 120 utilizes a fabrication device 122. Cleaning 130 utilizes a centrifuge 132 as well as other cleaning components, such as solvents. One or more devices of the manufacturing system 100 may be communicatively coupled via a network 105. Some or all of the devices shown may be on-site (e.g., housed within a single building) or may be housed in separate buildings and or sites. One or more of the devices may be implemented using a computing device 1000, described below with respect to FIG. 10.

In one embodiment, network 105 may include a public network (e.g., the Internet), a private network (e.g., a local area network (LAN), a wide area network (WAN), or a Bluetooth network), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as a stand-alone networks or in cooperation with each other. The network 105 may utilize one or more protocols of one or more devices that are communicatively coupled thereto. The network 105 may translate protocols to/from one or more protocols of the network devices.

In one embodiment, the model generation server 112 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to retrieve content metadata used for generating a volatility index. The model generation server 112 may be configured to generate 3D models of dental apparatuses based on model data 114 and/or patient data 116. The model data 114 may include stored model data and/or common features and/or templates used in or to generate 3D models. The patient data 116 may include patient-specific information, for example, from dental scans, which may describe physical locations, orientations, and/or shapes/surfaces of a patient's teeth. In some embodiments, the model generation server 112 utilizes the model data 114 and the patient data 116 to generate, for example, a dental apparatus having patient-matched surfaces at various locations of a non-patient-matched frame or support, but which may be sized and shaped based on patient data 116. In some embodiments, and as will be described in greater detail below, the model generation server 112 generates or modifies a 3D model to include various apertures that facilitate a cleaning process once a physical dental apparatus is fabricated based on the 3D model.

In one embodiment, the model data 114 and the patient data 116 may each be stored in one or more data stores, each of which may include one or more of a short-term memory (e.g., random access memory), a cache, a drive (e.g., a hard drive), a flash drive, a database system, or another type of component or device capable of storing data. The data stores may also include multiple storage components (e.g., multiple drives or multiple databases) that may also span multiple computing devices (e.g., multiple server computers). In some embodiments, the data stores may be cloud-based. One or more of the devices of manufacturing system 100 may utilize their own storage and/or the data stores to store public and private data, and the data stores may be configured to provide secure storage for private data. In some embodiments, the data stores may be used for data back-up or archival purposes.

The fabrication device 122 may be capable of one or more of injection molding, milling, fused deposition modeling, stereolithography, selective laser sintering, various other types of 3D printing technology, and various other fabrication methods as would be understood by one of ordinary skill in the art. In some embodiments, the fabrication device 122 is communicatively coupled to the model generation server 112, which may receive data descriptive a 3D model that is in a format suitable for use by the fabrication device, such as a standard tessellation language (STL) format file. In some embodiments, the fabrication device 122 utilizes a photopolymer resin for additive manufacturing of a component, such as a dental apparatus. In some implementations, the fabrication device 122 is configured to make one or more of: a mold/series of molds used to thermoform aligners, an aligner/series of aligners that are directly fabricated, palatal expander(s) such as series of rapid palatal expanders, dental attachment placement appliances, dental appliances with mandibular repositioning elements, restorative dental appliances, etc., or any combination thereof.

In one embodiment, the centrifuge 132 includes a chamber and a rotor for mounting one or more apparatuses. The rotor may be configured to secure one or more fabricated apparatuses (or counterweights) around its periphery such that a center-of-mass of the rotor is at its axis of rotation. In some embodiments, the fabricated apparatus and its build plate are mounted within the centrifuge chamber such that the apparatus faces the axis of rotation and a bottom surface of the build plate faces away from the axis of rotation. In some embodiments, the centrifuge 132 may provide environmental control within the chamber, including, for example, temperature control (e.g., for heating or cooling the apparatus), moisture control, and pressure control.

Figure 2B:
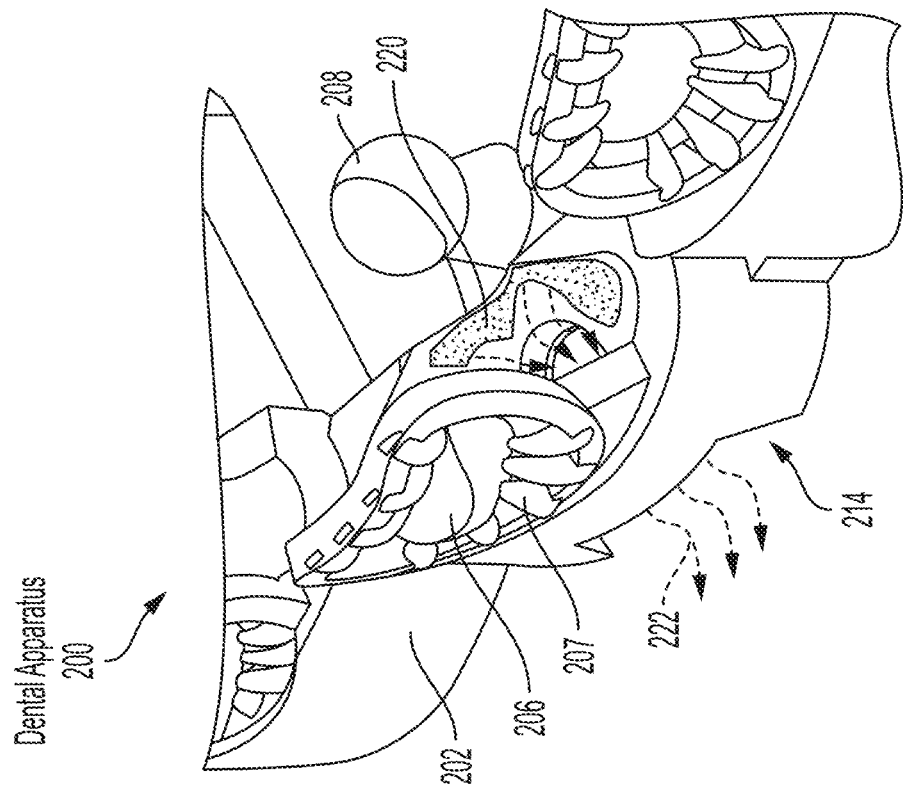
FIG. 2B illustrates solvent flow through an aperture of a dental apparatus in accordance with at least one embodiment.
Figure 2A:
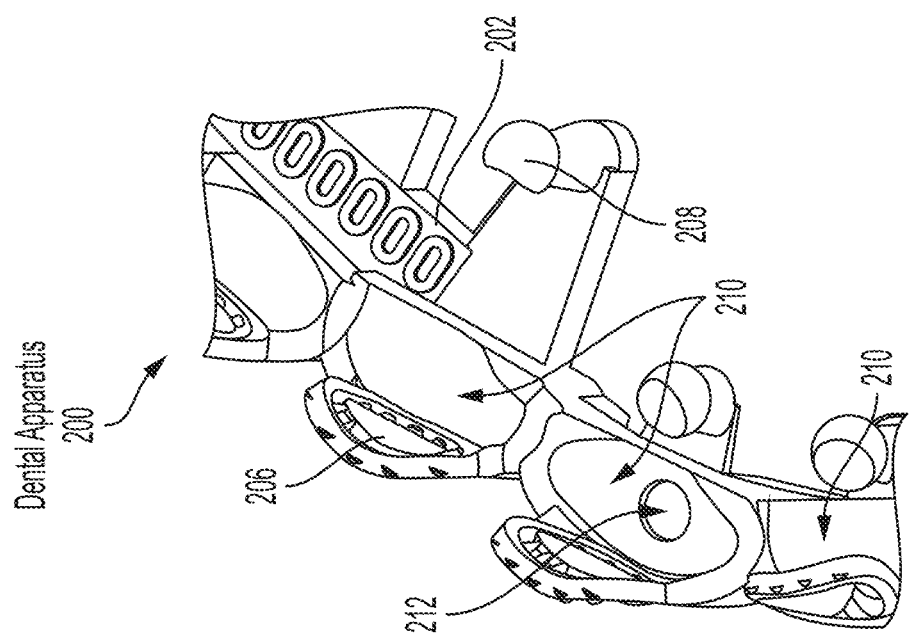
FIG. 2A illustrates a dental apparatus having an aperture formed through a cavity in accordance with at least one embodiment.
Figure 2C:
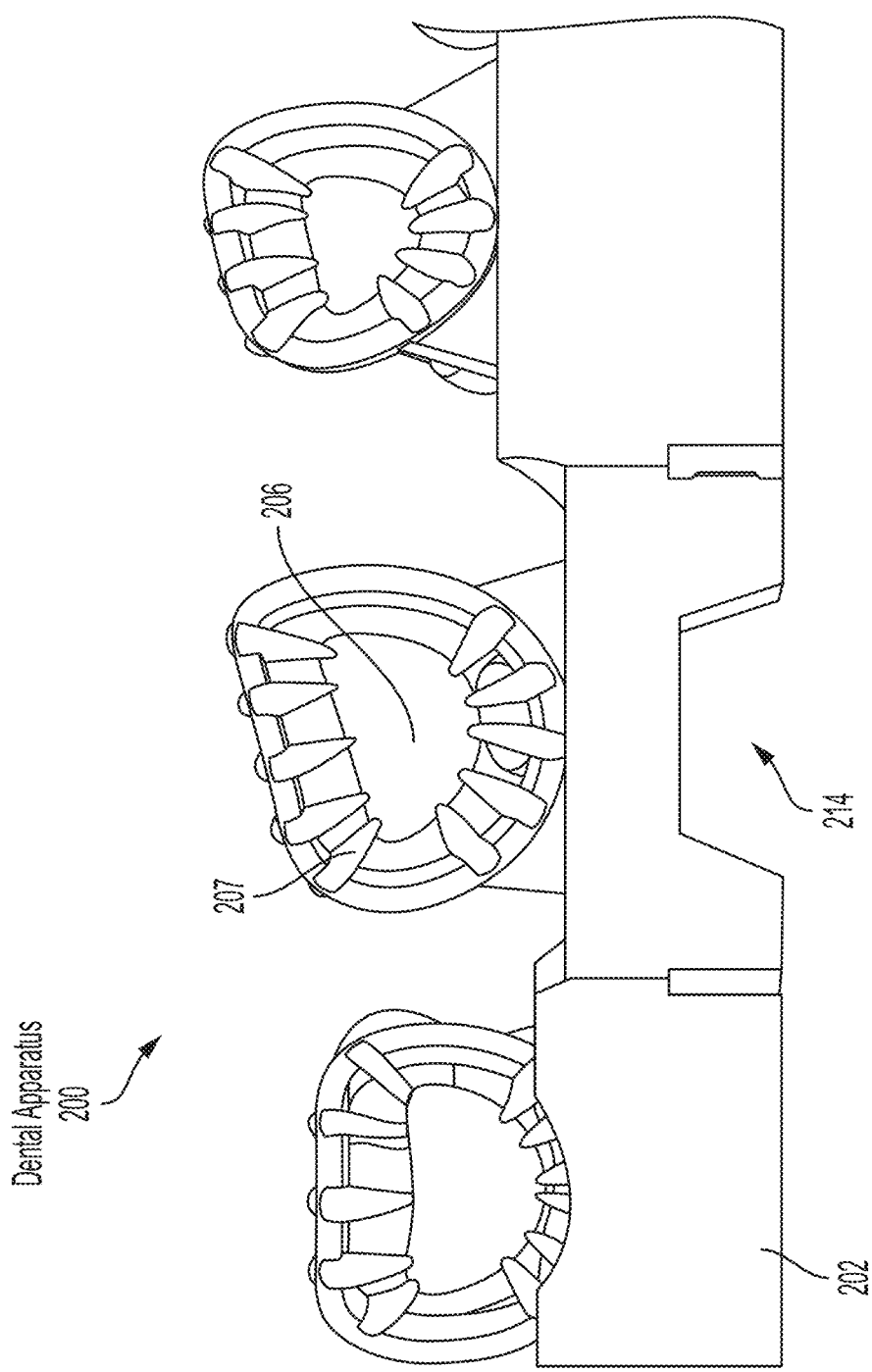
FIG. 2C illustrates a side profile of a dental apparatus in accordance with at least one embodiment.

FIGS. 2A-2C illustrate an exemplary dental apparatus 200. While the dental apparatus 200 is illustrated as a dental attachment placement appliance, this example is merely illustrative as the embodiments of the methodologies described herein are compatible with other types of dental apparatuses, or any other components. The dental apparatus 200 includes a frame 202 that is shaped to extend over at least a portion of a patient's dental arch. Concave surfaces 210 (e.g., cavities or other shapes having greater depth than their surrounding area) are located at various positions of the frame 202, which are each shaped to engage a single tooth (e.g., at a bottom edge of a respective tooth) along the dental arch. The dental apparatus 200 further includes dental attachment portions 206 that are each positioned and configured to contact one tooth along the dental arch (e.g., at a buccal surface of a respective tooth). Each dental attachment portion 206 is frangibly coupled to the frame by at least one strut 207. In some embodiments, the struts are formed around a perimeter of the dental attachment portions 206. The dental apparatus 200 further comprises retention supports 208 that help maintain the dental apparatus 200 in the correct position when inserted into the patient's mouth.

The dental apparatus 200 may be fabricated via an additive assembly process as a single unitary material formed from a polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g., greater than or equal to 10,000 Da, in some embodiments greater than or equal to 50,000 Da or greater than or equal to 100,000 Da). Polymers are commonly the polymerization product of one or more monomer precursors, and may be formed from a resin. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. In some embodiments, the dental apparatus is formed from one or more polymers such as polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or combinations thereof. The embodiments described herein are compatible with a range of plastics and/or polymers. Accordingly, this list is not all inclusive, but rather is exemplary. The plastics can be thermosets or thermoplastics.

In some embodiments, the polymer that is used to manufacture the dental apparatus 200 is a photo-curable material. The photo-curable material may include materials such as a polyester, a co-polyester, a polycarbonate, a polypropylene, a polyethylene, a polypropylene and polyethylene copolymer, a polyurethane, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a dendritic acrylate, a polyester urethane acrylate, a multifunctional acrylate, a polybutadiene urethane acrylate, a polyester urethane methacrylate, an aliphatic polyester urethane methacrylate (e.g., such as a BOMAR XR-741 MS), an aliphatic difunctional acrylate (e.g., such as Miramer UA5216), a polyether acrylate, an acrylic polyester acrylate, a polyester acrylate, an acrylic acrylate, a polyether urethane methacrylate, a silicone urethane acrylate, or combinations thereof. The photo-curable material may additionally include other materials in addition to, or instead of, the above mentioned materials. The photo-curable material can be provided in an uncured form (e.g., as a liquid, resin, etc.) and can be cured (e.g., by photopolymerization, light curing, laser curing, crosslinking, etc.). The properties of the material before curing may differ from the properties of the material after curing. Once cured, the materials herein can exhibit sufficient strength, stiffness, durability, biocompatibility, etc. for use in the dental apparatus 200. The post-curing properties of the materials used can be selected according to the desired properties for the dental apparatus 200.

In some embodiments, the materials that comprise the final printed object (e.g., the dental apparatus 200) may be biocompatible and bioinert materials. "Biocompatible," as used herein, may refer to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the photo-curable material is used to manufacture biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert," as used herein, can refer to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments herein, bioinert apparatuses are provided.

After exposure to light, the photo-curable material may become cured, and may at that point include crosslinked polymers. In some embodiments, the crosslinked polymers are characterized by a tensile stress-strain curve that displays a yield point after which the test specimen continues to elongate, but there is no increase in load. Such yield point behavior typically occurs "near" the glass transition temperature, where the material is between the glassy and rubbery regimes and may be characterized as having viscoelastic behavior.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein. As noted herein, the hybrid 3D printing techniques may combine advantages of stereolithography (SLA), digital light processing (DLP), and fused deposition modeling (FDM) into a single technology that can be used as the basis of 3D printing objects (dental appliances, hearing aids, medical implants, etc.) for mass production.

FIG. 2A illustrates one of the concave surfaces 210 as having an aperture 212 formed therethrough. The aperture 212 is shown as being formed through a maximum depth of the concave surface 210, though the aperture 212 may be formed at other locations. In some embodiments, multiple apertures 212 are formed through the same concave surface 210. In some embodiments, the aperture 212 is in a form of a round aperture, an elliptical aperture, a mesh, a square, a rectangle, a line, a notch, or any other suitable shape. The aperture 212 may have maximum diameters that range from, for example, about 0.5 millimeters to about 5 millimeters. Other concave surfaces 210 may also have one or more apertures 212 formed therethrough. In some embodiments, a diameter of the aperture 212 may be selected based on, for example, a viscosity of the resin (e.g., which may be in the range of 1 to 8 Pa·s), an inclination angle of the cavity, or any other criteria.

Figure 3A:
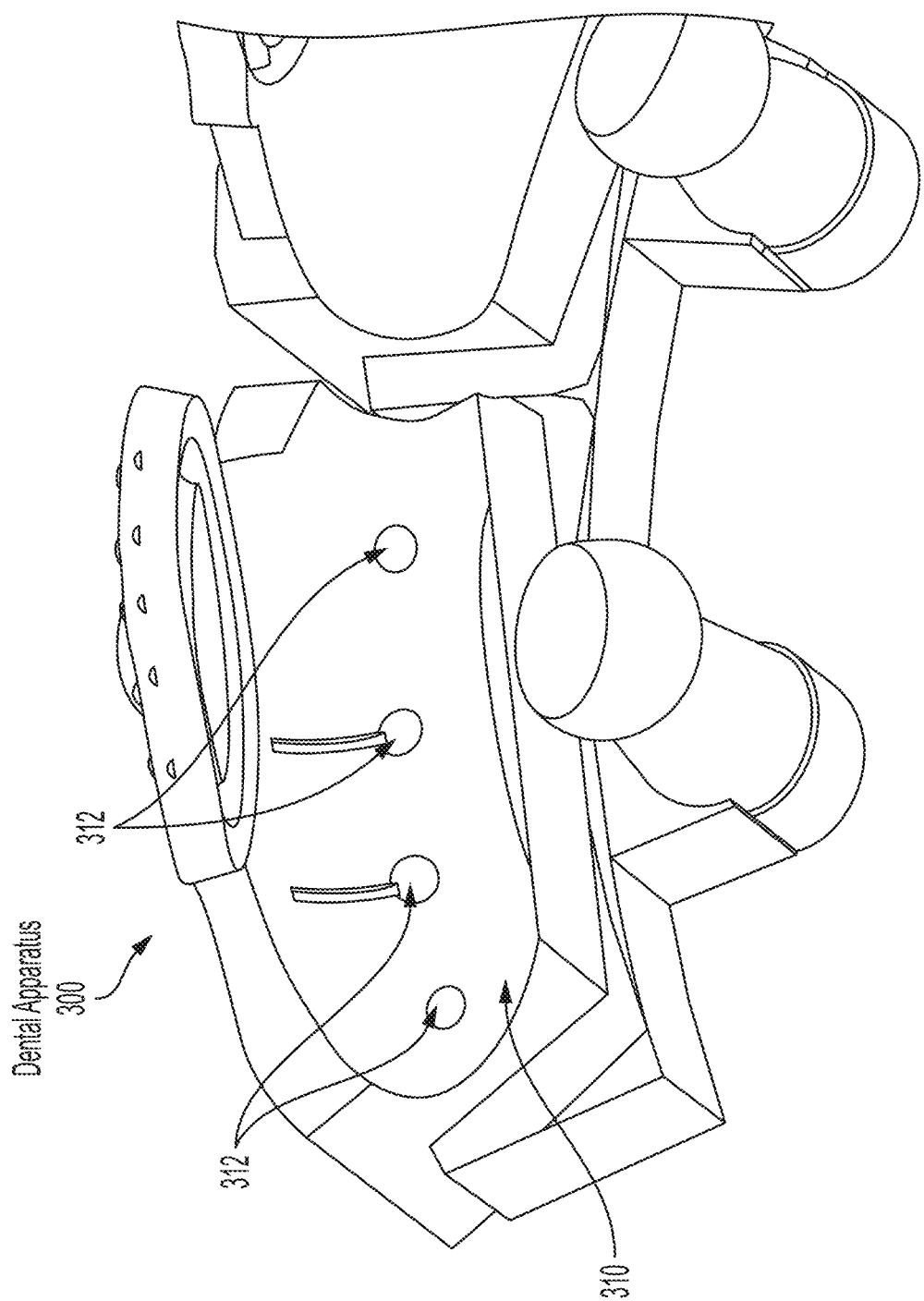
FIG. 3A illustrates multiple apertures formed through a cavity in a dental apparatus in accordance with at least one embodiment.
Figure 3B:
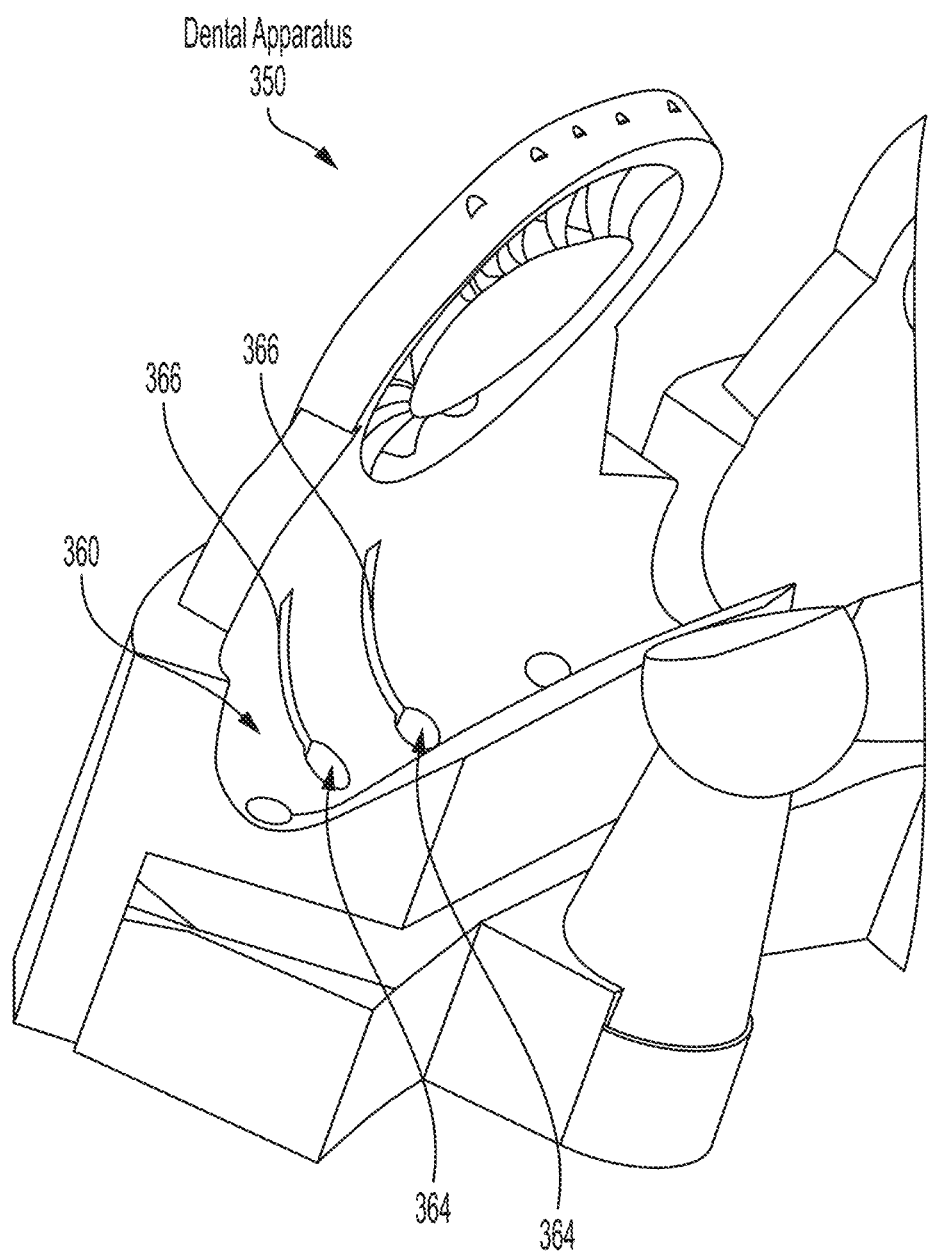
FIG. 3B illustrates channels formed in a cavity in a dental apparatus in accordance with at least one embodiment.

FIGS. 2B and 2C illustrate an exemplary additional aperture 214 formed below the aperture 212, which is in a form of a notch in the frame 202. The aperture 214 partially passes through the frame 202 to meet the aperture 212. This design further facilitates removal of residual resin 220 from the concave surface 210 by providing a flow path 222 through the aperture 212 and the aperture 214. FIG. 3A illustrates an example dental apparatus 300 having multiple apertures 312 formed in a single concave surface 310. FIG. 3B illustrates an example dental apparatus 350 having channels 366 formed around respective apertures 364. In this example, each channel 366 is oriented radially from its respective aperture 364 to facilitate flow of the residual resin toward its respective aperture 364. In general, the channels 366 can have any orientation without departing from the teachings of the present disclosure.

Figure 4A:
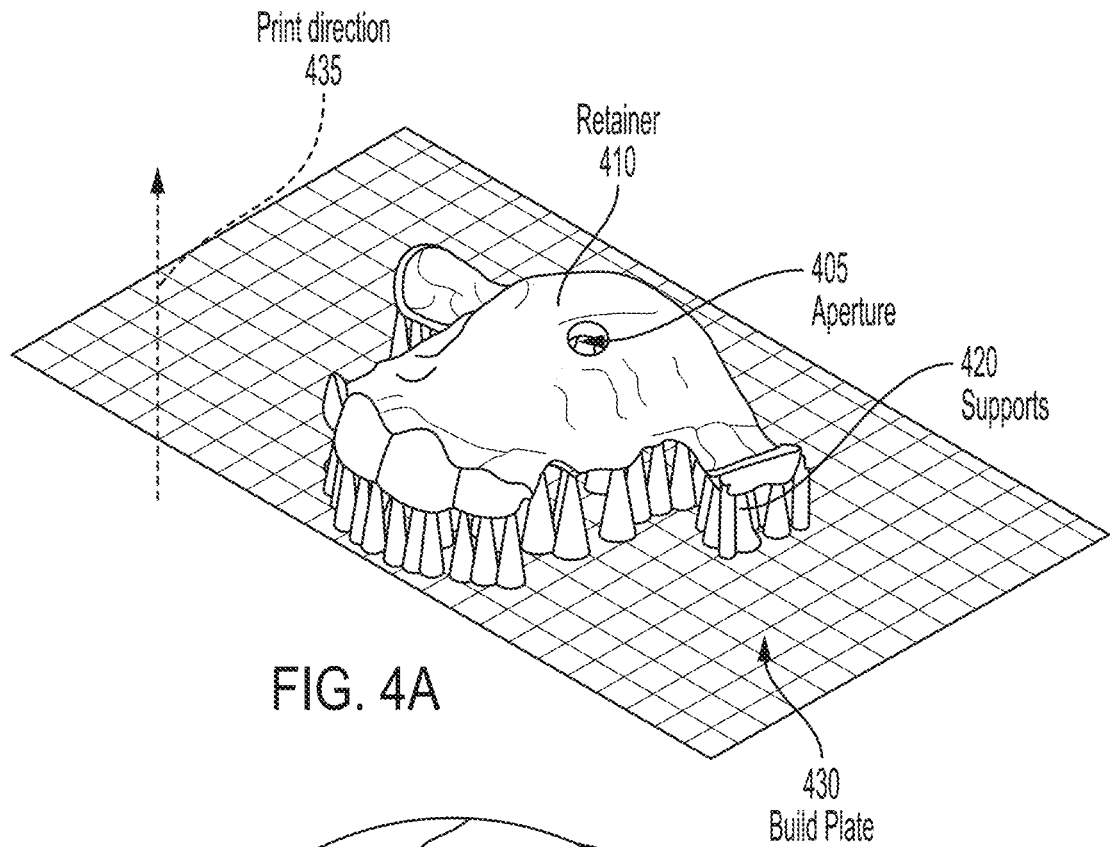
FIG. 4A illustrates the fabrication of a retainer in accordance with at least one embodiment.
Figure 4B:
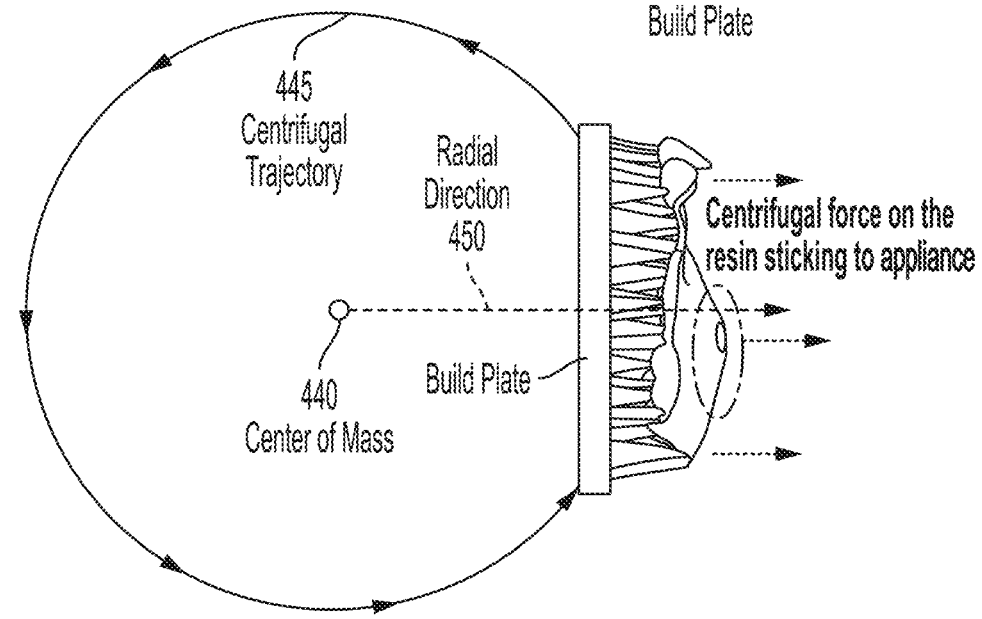
FIG. 4B illustrates a dental apparatus and build tray assembly mounted within a centrifuge chamber at a distance from a center of mass of the centrifuge rotor and along a radial direction in accordance with at least one embodiment.

FIG. 4A illustrates an exemplary fabricated retainer 410 in accordance with at least one embodiment. In this example, the retainer 410 is produced from an additive manufacturing process starting on a build plate 430. Resin is deposited and cured along a print direction 435 (e.g., along a surface normal of the build plate 430) to first produce supports 420 that extend away from the build plate 430. In some embodiments, the supports 420 taper along the print direction 435. The retainer 410 is then printed starting from the tapered ends of the supports 420, which then serve as connection points that frangibly couple the retainer 410 to the build plate 430. As illustrated, the retainer 410 includes an aperture 405 at a concave surface having high curvature. It should be noted although only one aperture is shown on the retainer, in general, retainer can have any number of apertures without departing from the teachings of the present disclosure In FIG. 4B, the retainer 410 and build plate 430 are further illustrated as being mounted within a centrifuge chamber at a distance from a center of mass 440 of the centrifuge rotor and along a radial direction 450. During centrifugation, the build plate 430 faces away from the center of mass 440 while the assembly moves along the centrifugal trajectory 445. Centrifugal forces exerted along the radial direction 450 cause residual resin on the retainer to flow outward and away from the retainer 410. The aperture 405 allows residual resin to flow out from the retainer and prevents the resin from being trapped by the concave surface. Exemplary centrifugation settings include 1-10 minutes at about 100 to 400 g (e.g., 3 minutes at about 300 g).

Figure 4C:
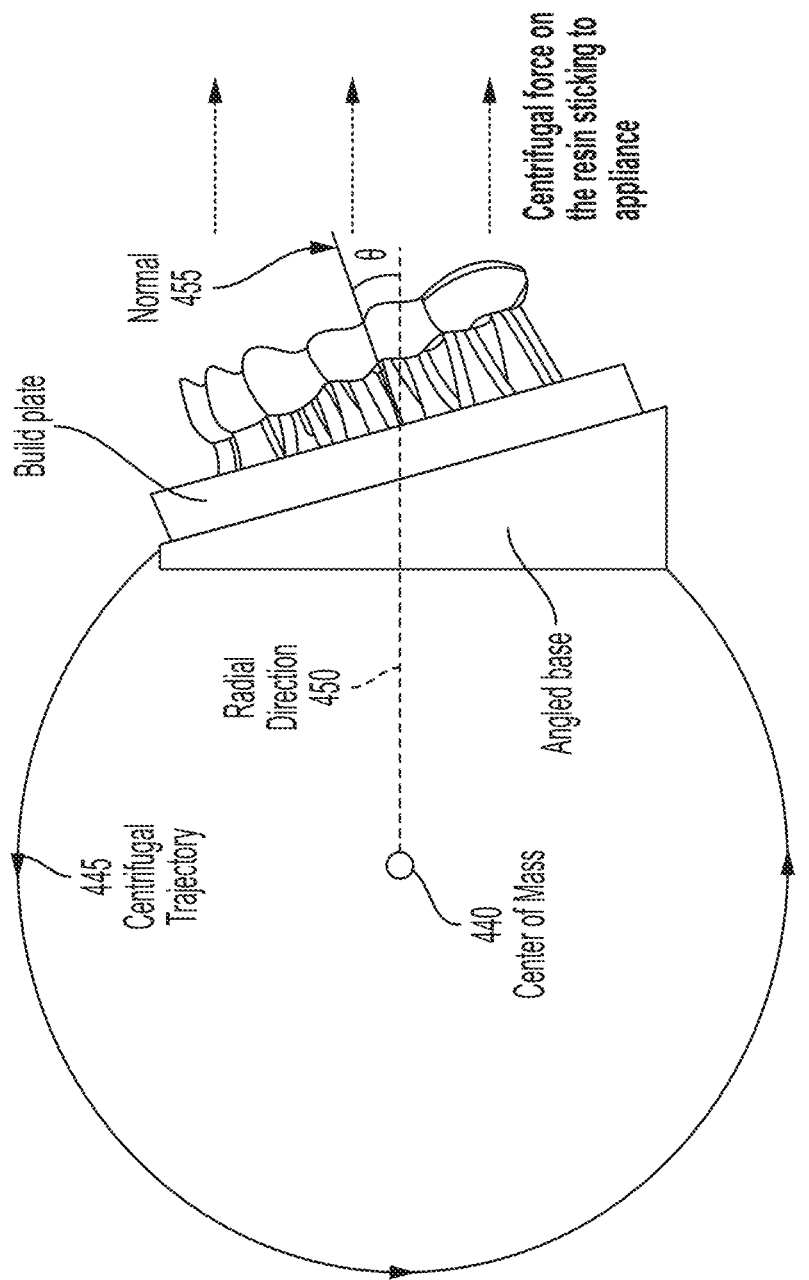
FIG. 4C illustrates a dental apparatus and build tray assembly mounted at an angle in a centrifuge chamber in accordance with at least one embodiment.

FIG. 4C illustrates a build plate and retainer 410 assembly mounted at a non-zero angle, θ, within the centrifuge chamber. In one example, the non-zero angle can be achieved by further mounting the assembly to an angled base such that the angle, θ, is formed between a surface normal 455 of the build plate 430 and the radial direction 450. This may further facilitate flow of residual resin from the retainer 410 and through the aperture 405. In some embodiments, the angle θ can range from about 10° to about 35°, e.g., about 10° to about 15°, about 15° to about 20°, about 20° to about 25°, about 25° to about 30°, or about 30° to about 35°. In some embodiments, the apertures(s) are designed to be located at local/global minima of the contours of the retainer 410 (or dental apparatus more generally) that lie along the radial direction 450 (i.e., the direction of centrifugal force).

Figure 4D:
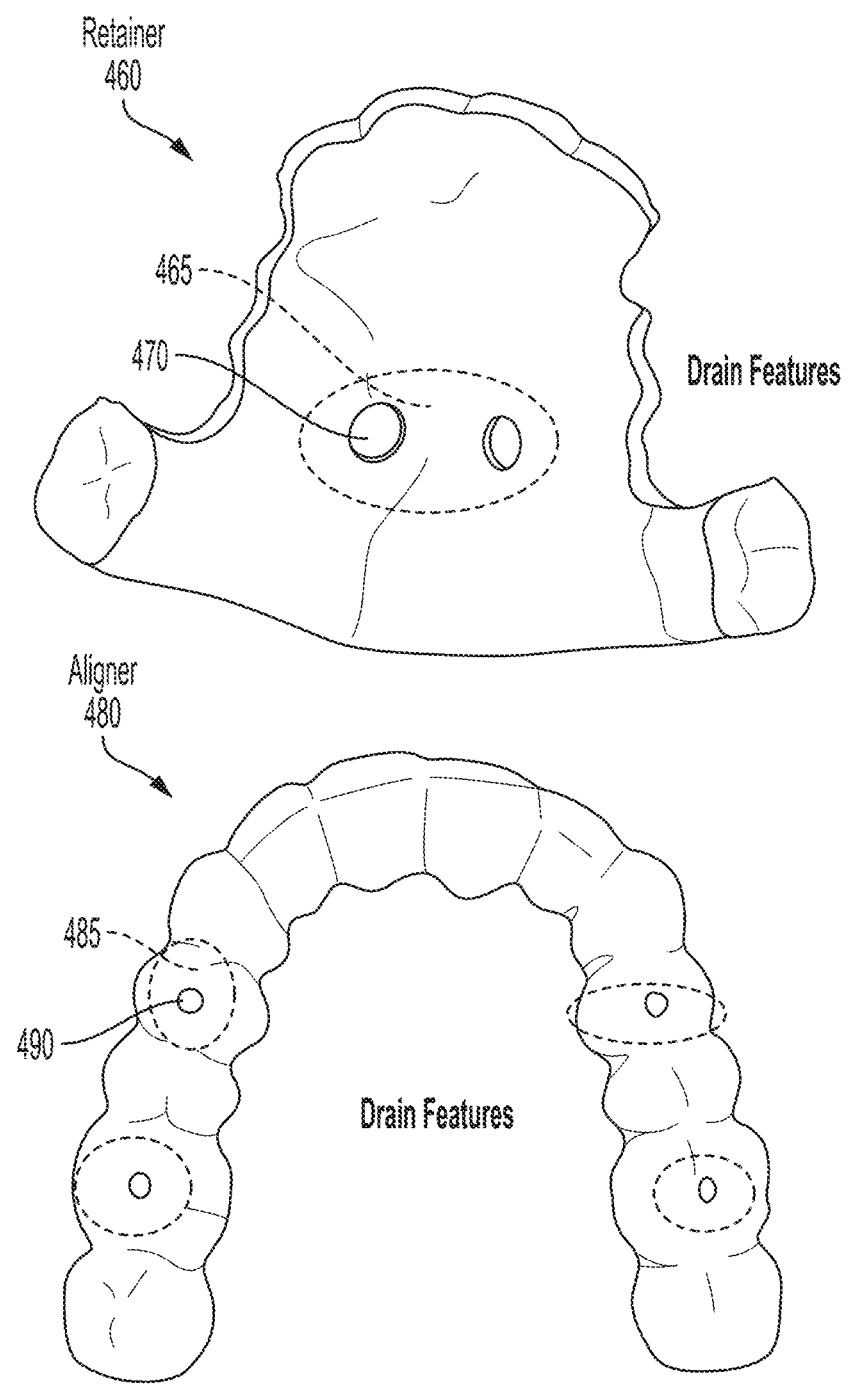
FIG. 4D illustrates a retainer and an aligner having apertures formed therethrough in accordance with various embodiments.

FIG. 4D illustrates an exemplary retainer 460 and aligner 480 produced in accordance with the embodiments described herein. The retainer 460 includes a concave surface 465 corresponding to a local maximum along the surface of the retainer 460. Two apertures 470 are formed in this region, which have diameters of about 4-6 mm. In some embodiments, more or less apertures can be present. For example, a single aperture at a center of the concave surface 465 may be present. Additional apertures may be present at different regions of the retainer 460.

The aligner 480 includes multiple concave surfaces 485, which correspond to local minima of regions designed to contact the patient's teeth. In this example, each concave surface 485 includes a corresponding aperture 490, which may range from about 1-2 mm in diameter.

In some embodiments, one or more of the apertures 470 and 490 are formed during the additive manufacturing process. In other embodiments, one or more of the apertures 470 and 490 are formed after the additive manufacturing process, for example, by mechanically drilling through the respective concave surfaces. In some embodiments, the sizes and locations of the apertures can be determined based on: viscosity/flowability of the resin, resulting structural stiffness changes, centrifugal force and/or centrifugation time, available surface area of the concave surfaces, and/or any other parameters or combinations thereof. For example, to produce the retainer 460, it may be determined that there are ranges of acceptable centrifugal forces and centrifugation times for cleaning the retainer 460 after fabrication to avoid, reduce, or minimize deformation. With these parameters, sizes of the apertures 470 may be selected to allow for residual resin to fully drain from the retainer 460 during centrifugation such that solvent-based cleaning is not needed. In general, size of the apertures 470 may be determined such that most (or all) of the residual resin is removed from the retainer during centrifugation. After the centrifugation step, if there is still uncured resin on the retainer, a solvent-based cleaning step may be used. Upper limits on the sizes of the apertures 470 may be imposed based on tolerable changes in one or more structural rigidity parameters (e.g., a resulting change in flexural rigidity may not decrease by more than 10%). In some embodiments, after centrifugation, in order to improve/maintain structural rigidity, one or more of the apertures may be sealed, for example, by mechanically inserting a plug of the same or different material and/or applying a biocompatible adhesive.

The retainer 460 and the aligner 480 are merely exemplary. It is to be understood that the methods described herein may be applied to the fabrication of other apparatuses or portions thereof, such as palatal expanders, sleep apnea devices, or any other device designed for prolonged contact with the interior of a patient's mouth.

FIG. 5 is an example flow diagram illustrating a method 500 of forming a dental apparatus in accordance with at least one embodiment. At block 510, a dental apparatus (e.g., the dental apparatuses 200, 300, 350, 410, 460, or 480) is fabricated from a resin using an additive fabrication process (e.g., using the model generation server 112 in combination with the fabrication device 122 of the manufacturing system 100). In some embodiments, the dental apparatus has a body shaped to contact and conform to at least a portion of a dental arch of a patient, with one or more concave surfaces disposed along the body. In some embodiments, the dental apparatus includes one or more apertures formed through each of the plurality of concave surfaces as described herein. In some embodiments, one or more of the apertures is formed in the dental apparatus after fabrication (for example, by manual drilling, or any other method). In some embodiments, one or more of the apertures is formed during the additive fabrication process. In some embodiments, the aperture may be in a form of a round aperture, an elliptical aperture, a mesh, or any other shape. In some embodiments, at least one of the concave surfaces includes two or more apertures formed therethrough. In some embodiments, at least one of the concave surfaces comprising an aperture further comprises at least one channel formed therein that is radially oriented with respect to the aperture and facilitates flow of the residual resin toward the aperture. In some embodiments, a maximum diameter of at least one aperture is from about 0.5 millimeters to about 5 millimeters.

In some embodiments, the dental apparatus is a retainer for which the one or more concave surfaces are configured to engage the dental arch. For example, the retainer comprises at least one aperture formed through a concave surface in a central region of the retainer.

In some embodiments, the dental apparatus is an aligner for which the one or more concave surfaces are configured to engage teeth along the dental arch. For example, the aligner comprises at least one aperture formed through a concave surface shaped to substantially conform to a tooth when worn by a patient.

In some embodiments, the dental apparatus is formed from a polymer selected from a group consisting of a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, and a combination thereof.

At block 520, the dental apparatus is oriented on a rotor of a centrifuge chamber (e.g., a chamber of the centrifuge 132) such that at least a subset of the concave surfaces of the dental apparatus substantially face a center of mass of the rotor. In some embodiments, the dental apparatus and its corresponding build plate are arranged such that, during the centrifuging, a normal direction of the build plate is oriented substantially parallel to a radial direction that passes through the center of mass of the centrifuge rotor. In other embodiments, the normal direction of the build plate is oriented at a non-zero angle with respect to the radial axis. In some embodiments, the non-zero angle is from about 10° to about 35°.

At block 530, the dental apparatus is centrifuged using parameters sufficient to remove residual resin from surfaces of dental apparatus resulting from the additive fabrication process. Each aperture can provide a flow path for the residual resin during the centrifugation so as to reduce or eliminate pooling of the residual resin on a respective concave surface of the dental apparatus. In some embodiments, the dental apparatus is heated during centrifugation to a temperature sufficient to lower the viscosity of the residual resin and facilitate flow through the apertures. In some embodiments, a g-force of the centrifugation may be less than or equal to about 300 g (where g is about 9.8 m/s$^2$). In some embodiments, a temperature of the centrifugation may range from about 20° C. to about 60° C.

At block 540, the dental apparatus may optionally be cleaned with a solvent to further remove residual resin, which may have not been removed by the centrifuging. In situations where some residual resin remains, an amount of solvent used to clean the dental apparatus may be less than an amount of solvent sufficient for cleaning a similar dental apparatus that does not have any apertures through its concave surfaces. In some embodiments, the dental apparatus may be in condition for use in a dental procedure without an intermediate solvent-based cleaning step after the centrifuging. In such embodiments, where no solvent-based cleaning is required after centrifuging, block 540 may be omitted.

The following examples of fabricated dental apparatuses are set forth to assist in understanding the disclosure and should not, of course, be construed as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein.

Figure 6A:
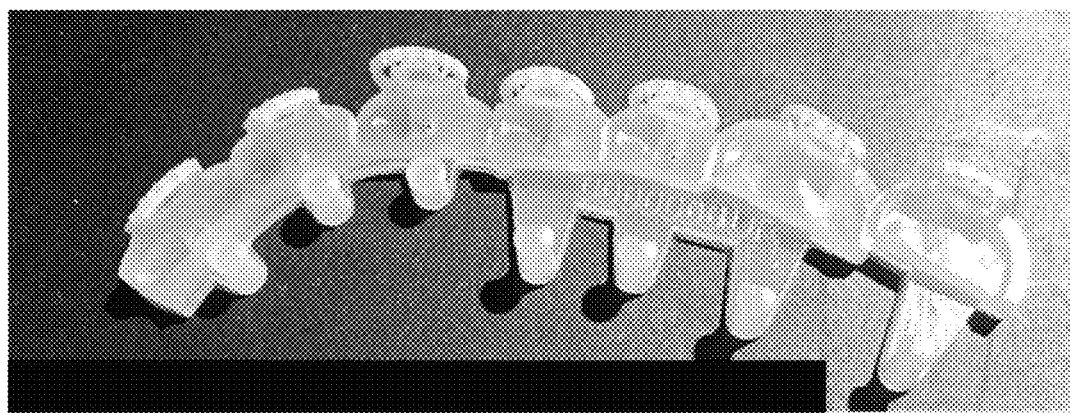
FIG. 6A is an image of a dental placement appliance fabricated with 0.6 millimeter diameter apertures.
Figure 6B:
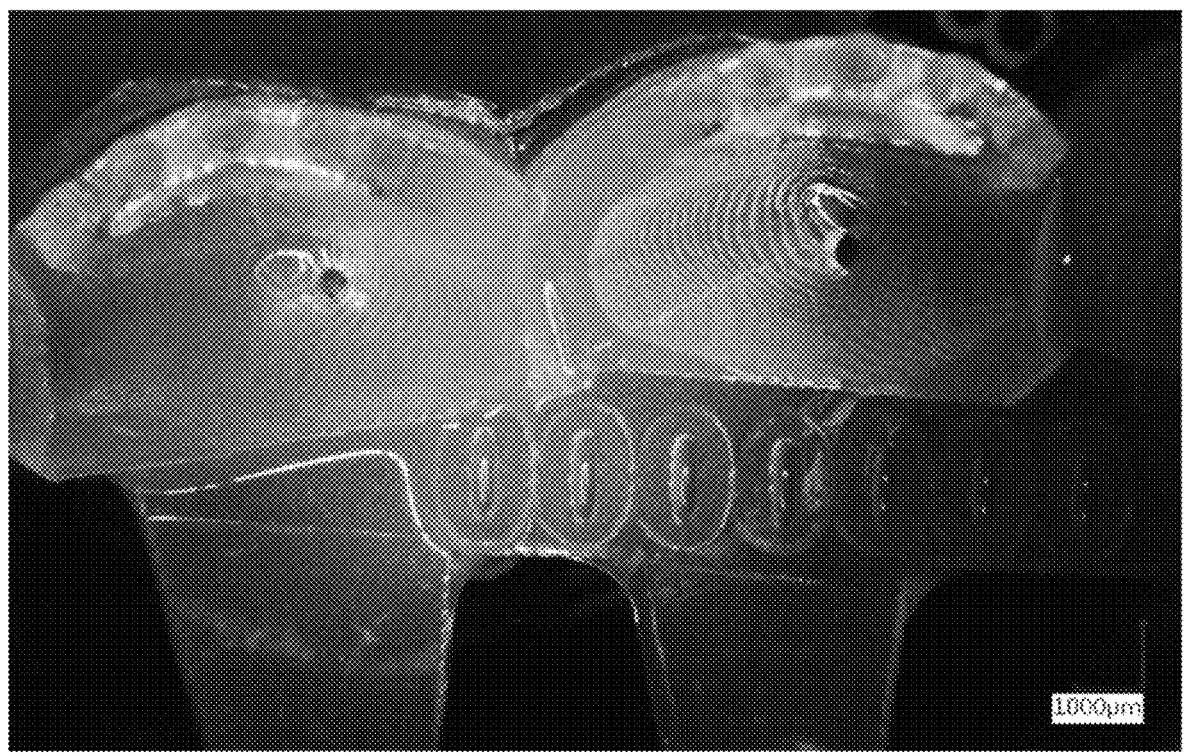
FIG. 6B is an image showing an enlarged view of the dental placement appliance fabricated with 0.6 millimeter diameter apertures.
Figure 7A:
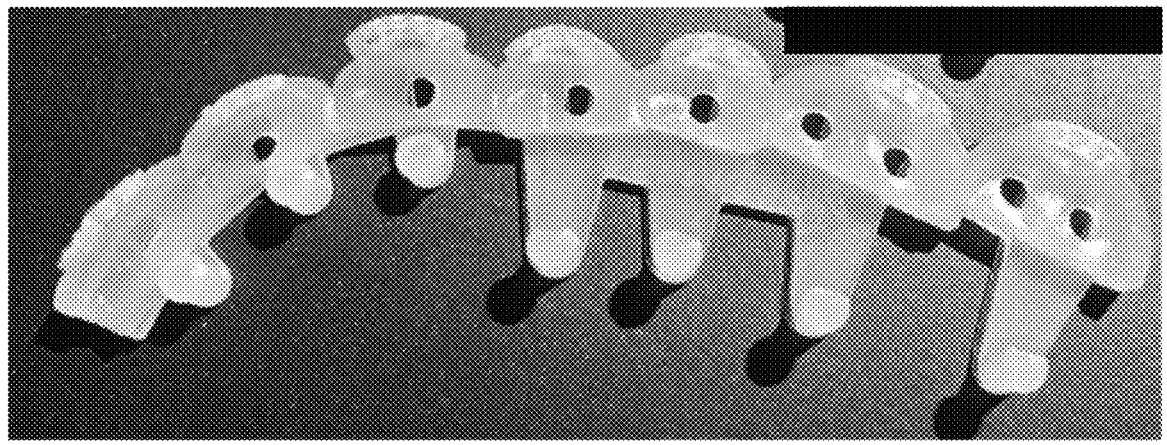
FIG. 7A is an image of a dental placement appliance fabricated with 2 millimeter diameter apertures.
Figure 7B:
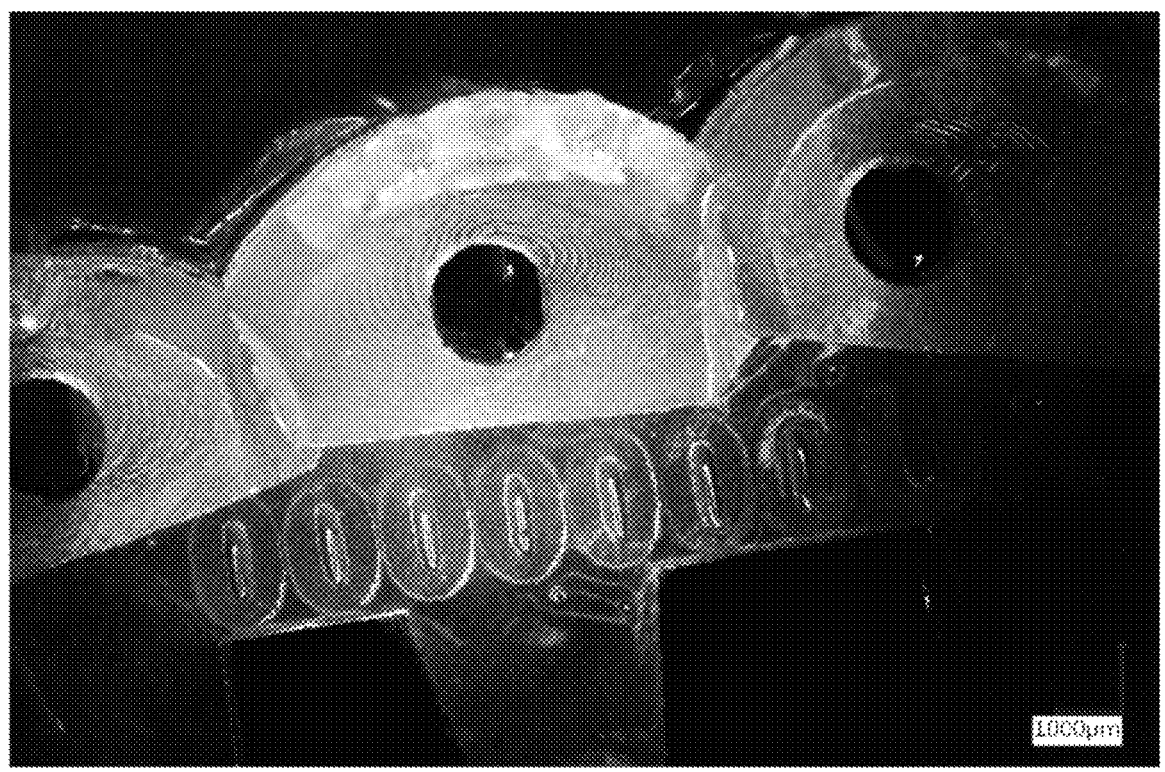
FIG. 7B is an image showing an enlarged view of the dental placement appliance fabricated with 2 millimeter diameter apertures.

In one example, dental attachment placement appliances were prepared using a Caligma digital light processing (DLP) 3D printer using a standard resin and a wetting agent at 0.5 wt. % at 28° C. Centrifugation was performed at room temperature with a G-force of approximately 90 g for 5-10 minutes. Post-curing was performed with Clearstone UV LED curing equipment. No solvent was used to clean the apparatuses. FIGS. 6A and 6B are images of an attachment placement appliance fabricated with 0.6 millimeter diameter apertures, and FIGS. 7A and 7B are images of a placement appliance fabricated with 2 millimeter diameter apertures.

Figure 7C:
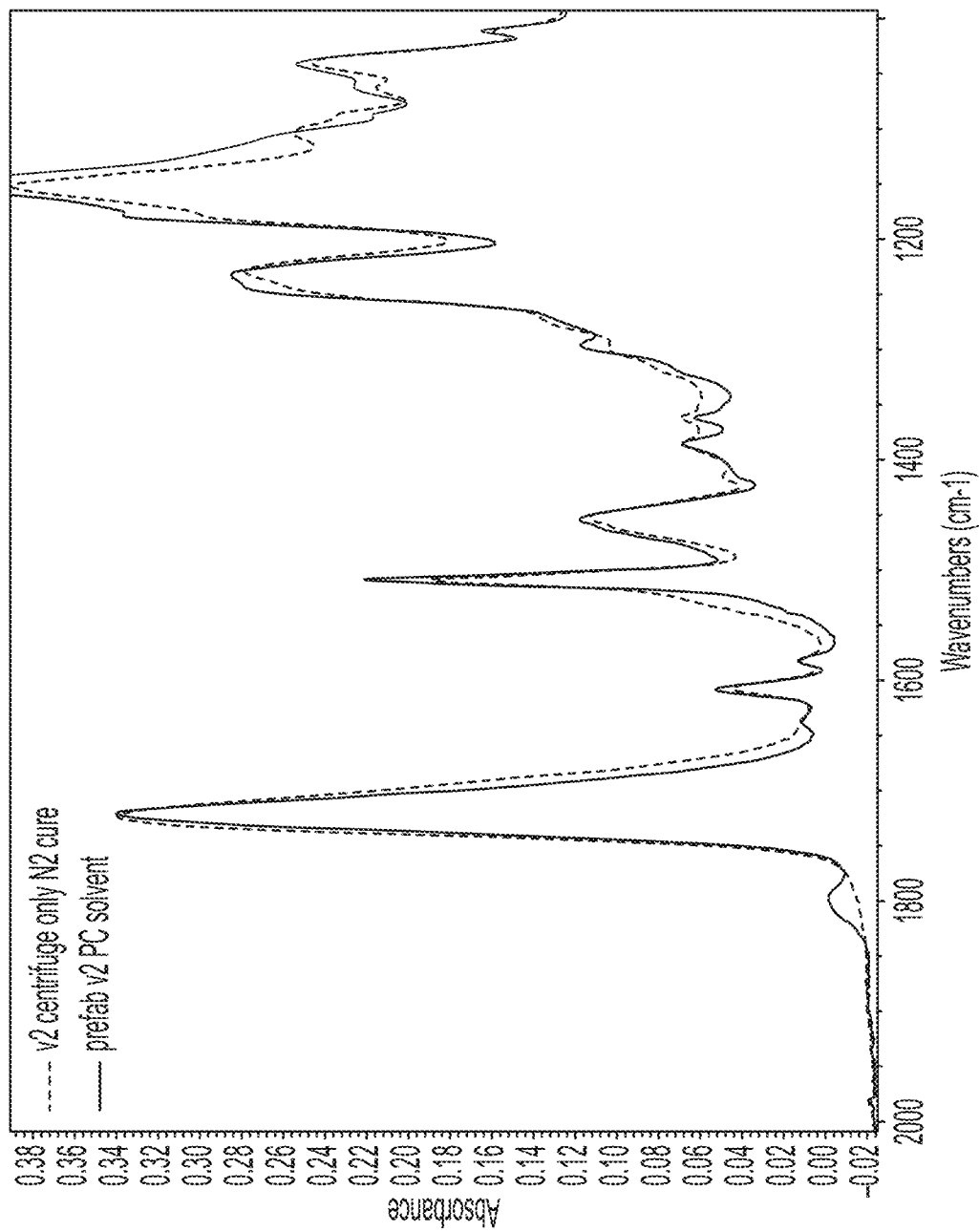
FIG. 7C is an example plot comparing attenuated total reflectance Fourier transform infrared (ATR-FTIR) spectroscopy measurements for dental apparatuses cleaned with centrifuging only and cleaned with centrifuging and a solvent.

FIG. 7C is a plot comparing attenuated total reflectance Fourier transform infrared (ATR-FTIR) spectroscopy measurements for two example dental apparatuses, one of which was cleaned with centrifuging only, and the other one was cleaned with centrifuging and a solvent. As shown in the figure, the ATR-FTIR spectroscopy measurements show no significant difference between the two approaches, though the centrifuge-only apparatus showed a slight improvement at a wave number of about 1640 cm$^{-1}$. Both dental apparatuses were manufactured using an additive manufacturing process, and both dental apparatuses included apertures formed to permit the evacuation of pooled uncured resin during centrifugation.

Figure 8:
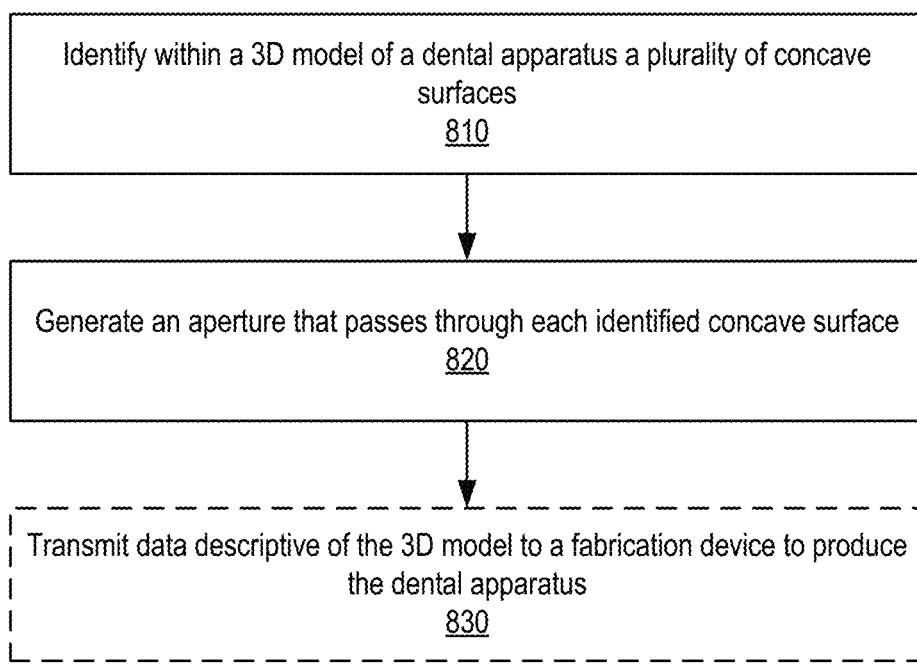
FIG. 8 is an example flow diagram illustrating a method of modifying a three-dimensional model representative of a dental apparatus in accordance with at least one embodiment.

FIG. 8 is an example flow diagram illustrating a method 800 of modifying a three-dimensional model representative of a dental apparatus in accordance with at least one embodiment. At block 810, a processing device (e.g., a processing device of the model generation server 112) identifies, within a 3D model of a dental apparatus, a plurality of concave surfaces. The processing device may import an already generated 3D model (e.g., from the model data 114), or may generate a new 3D model (e.g., based on the model data 114 and/or the patient data 116). In some embodiments, the processing device identifies the plurality of concave surfaces as those that are likely to accumulate fluid when the dental apparatus, after fabrication, is subjected to a centrifugation process. For example, surfaces that are designed to be patient-matched (e.g., surfaces representing those that are shaped to conform to a patient's teeth or palate) may be identified as the concave surfaces.

Figure 9:
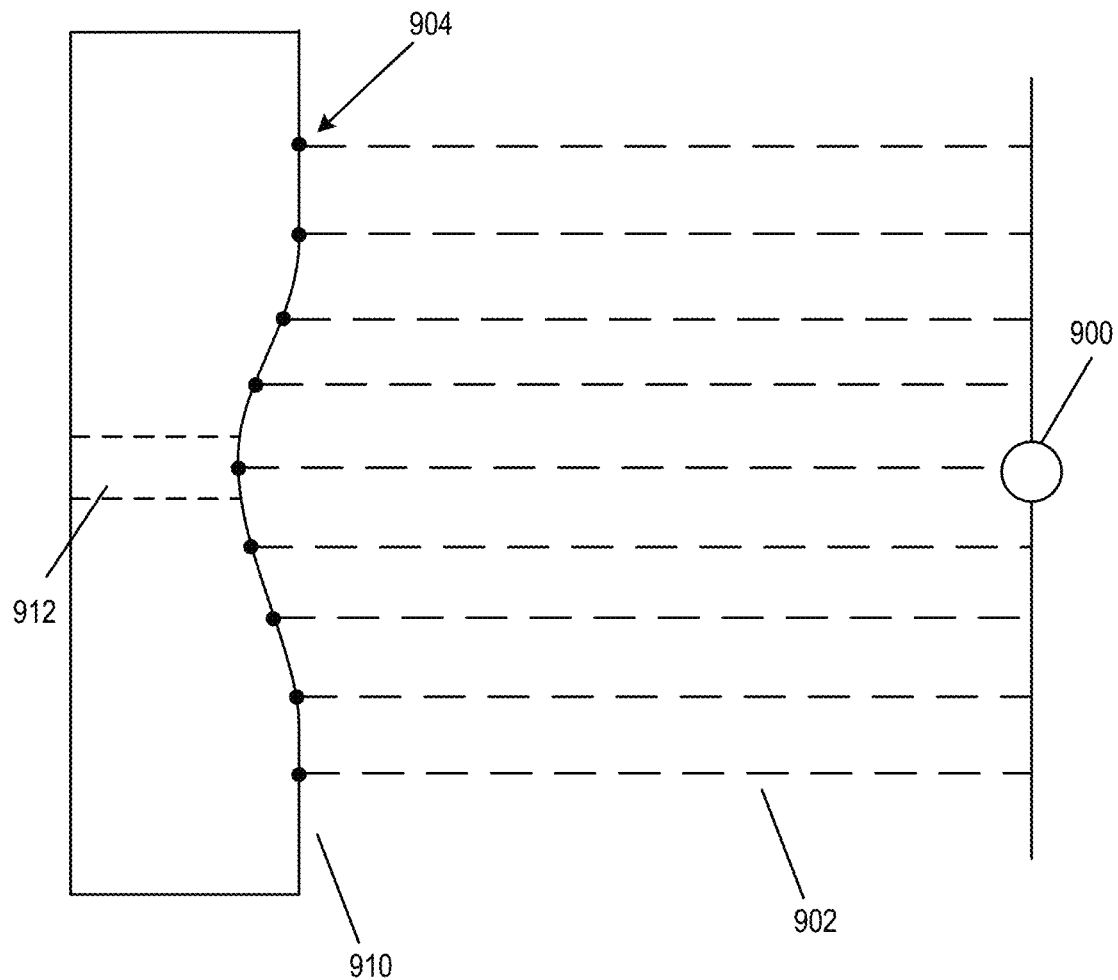
FIG. 9 is a schematic illustrating identification of concave surfaces on a dental apparatus in accordance with at least one embodiment.

In some embodiments, the processing device identifies the plurality of concave surfaces by, for example, computing a point representation of a center of mass of a rotor based on an estimated position and orientation of the dental apparatus when fabricated and mounted within a centrifuge chamber. This is illustrated in FIG. 9, which shows a point 900 representing the estimated center of mass of the rotor base, which is estimated based on an anticipated orientation of the fabricated dental apparatus (as represented by the 3D model) when mounted to the centrifuge rotor. A depth map is then computed that maps the outer surface and/or inner surface of the 3D model 910 to the point 900 (depending on which surface is to face the point 900). For example, a plane that passes through the point 900 may be computed, which is orthogonal to a longitudinal axis estimated to run from the center-of-mass of the rotor to the fabricated dental apparatus. The processing device computes the depth map from distances 902 from the plane to points 904 along the surface of the mesh of the 3D model 910. To identify a concave surface, the processing device computes a local minimum from the depth map, and may designate portions of the outer surface or inner surface of the 3D model 910 centered around the local minimum as a concave surface for which one or more apertures is to be generated. For example, the region 912 represents an aperture formed in the 3D model 910 at the identified local minimum.

Referring once again to FIG. 8, at block 820, the processing device generates one or more apertures that pass through each identified concave surface. In some embodiments, at least one aperture is positioned at a location of the concave surface having the greatest depth (e.g., a local minimum point), or substantially close to the location with greatest depth. In some embodiments, more than one aperture is positioned within an identified concave surface. In some embodiments, at least one aperture is in a form of a round aperture, an elliptical aperture, a mesh, or any other shape. In some embodiments, the aperture may be characterized by two or more diameters (e.g., a funnel-like aperture). For example, the diameter may be smaller near the concave surface and increase with depth of the aperture, or any other arrangements. In some embodiments, multiple apertures may be formed as an ordered (e.g., honeycomb-shaped) or disordered array. In some embodiments, a shape and/or size of an aperture may be selected based on, for example, an inclination angle of the concave surface, viscosity of the resin, temperature inside the centrifuge chamber, and/or any other parameter.

At block 830, which is optional, data descriptive of the 3D model is transmitted to a fabrication device (e.g., the fabrication device 122) in a format suitable for additive manufacturing (e.g., an STL file).

Figure 10:
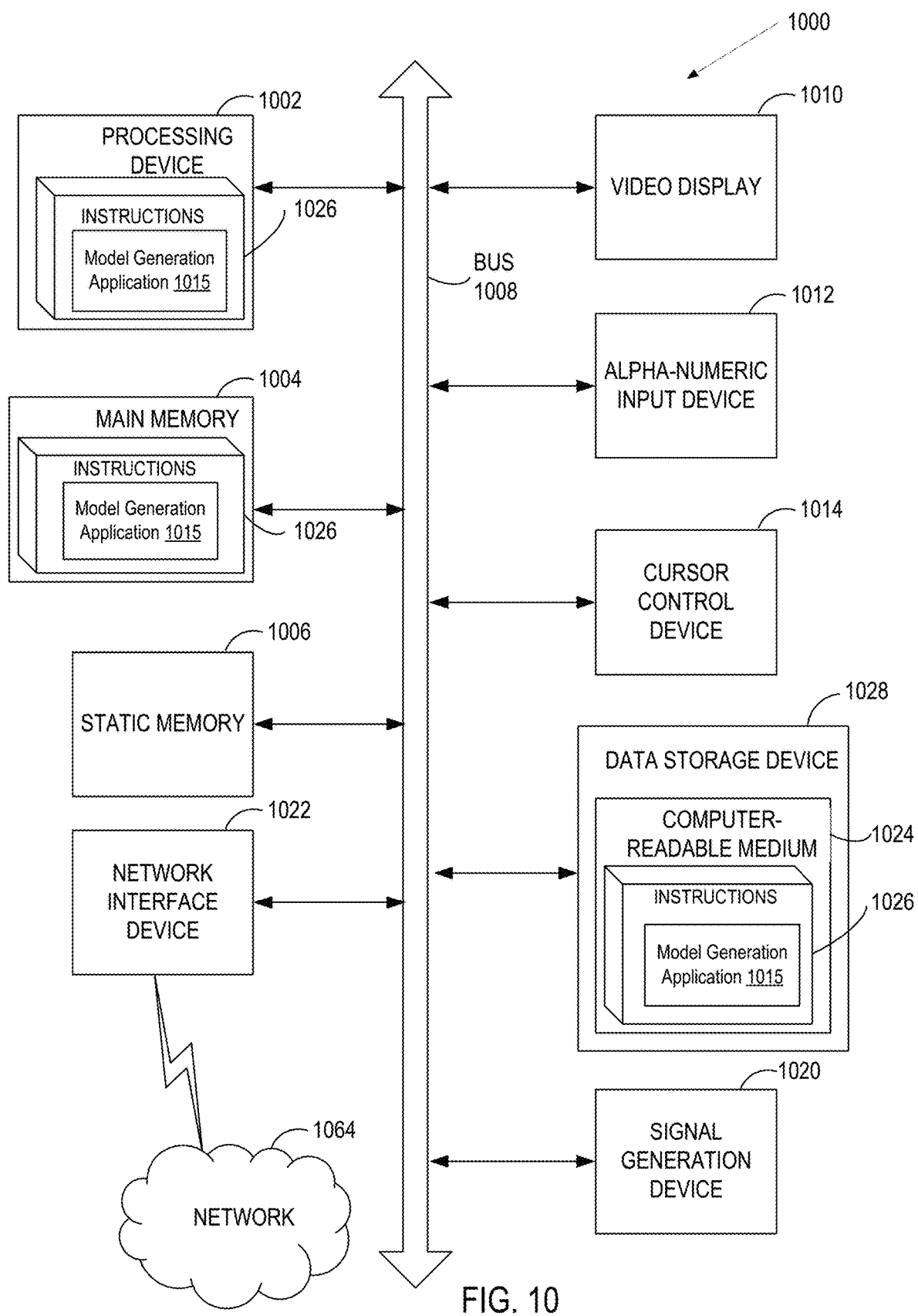
FIG. 10 illustrates a diagrammatic representation of a computing device which may be utilized in at least one embodiment.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The computing device 1000 may correspond, for example, to model generation server 112 of FIG. 1. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1028), which communicate with each other via a bus 1008.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1026) for performing operations and steps discussed herein.

The computing device 1000 may further include a network interface device 1022 for communicating with a network 1064. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1028 may include a machine-readable storage medium (or more specifically a non-transitory computer-readable storage medium) 1024 on which is stored one or more sets of instructions 1026 embodying any one or more of the methodologies or functions described herein, such as instructions for a model generation application 1015 (which may implement logic described, for example, with respect to the method 800). A non-transitory storage medium refers to a storage medium other than a carrier wave. The instructions 1026 may also reside, completely or at least partially, within the main memory 1004 and/or within the processing device 1002 during execution thereof by the computer device 1000, the main memory 1004 and the processing device 1002 also constituting computer-readable storage media.

The computer-readable storage medium 1024 may also be used to store the model data 114 and/or the patient data 116. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

FIG. 11 illustrates an exemplary tooth repositioning appliance or aligner 1100 that can be worn by a patient in order to achieve an incremental repositioning of individual teeth in the jaw. The appliance can include a shell (e.g., a continuous polymeric shell or a segmented shell) having teeth-receiving cavities that receive and resiliently reposition the teeth. An aligner (also referred to as an appliance) or portion(s) thereof may be indirectly fabricated using a physical model of teeth. For example, an appliance (e.g., polymeric appliance) can be formed using a physical model of teeth and a sheet of suitable layers of polymeric material.

The appliance or aligner 1100 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved an also serve as a base or anchor for holding the appliance in place over the teeth. In some cases, however, it may be desirable or necessary to provide individual attachments or other anchoring elements 1104 on mold 1102 with corresponding receptacles or apertures 1106 in the appliance or aligner 1100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893. Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 11B:
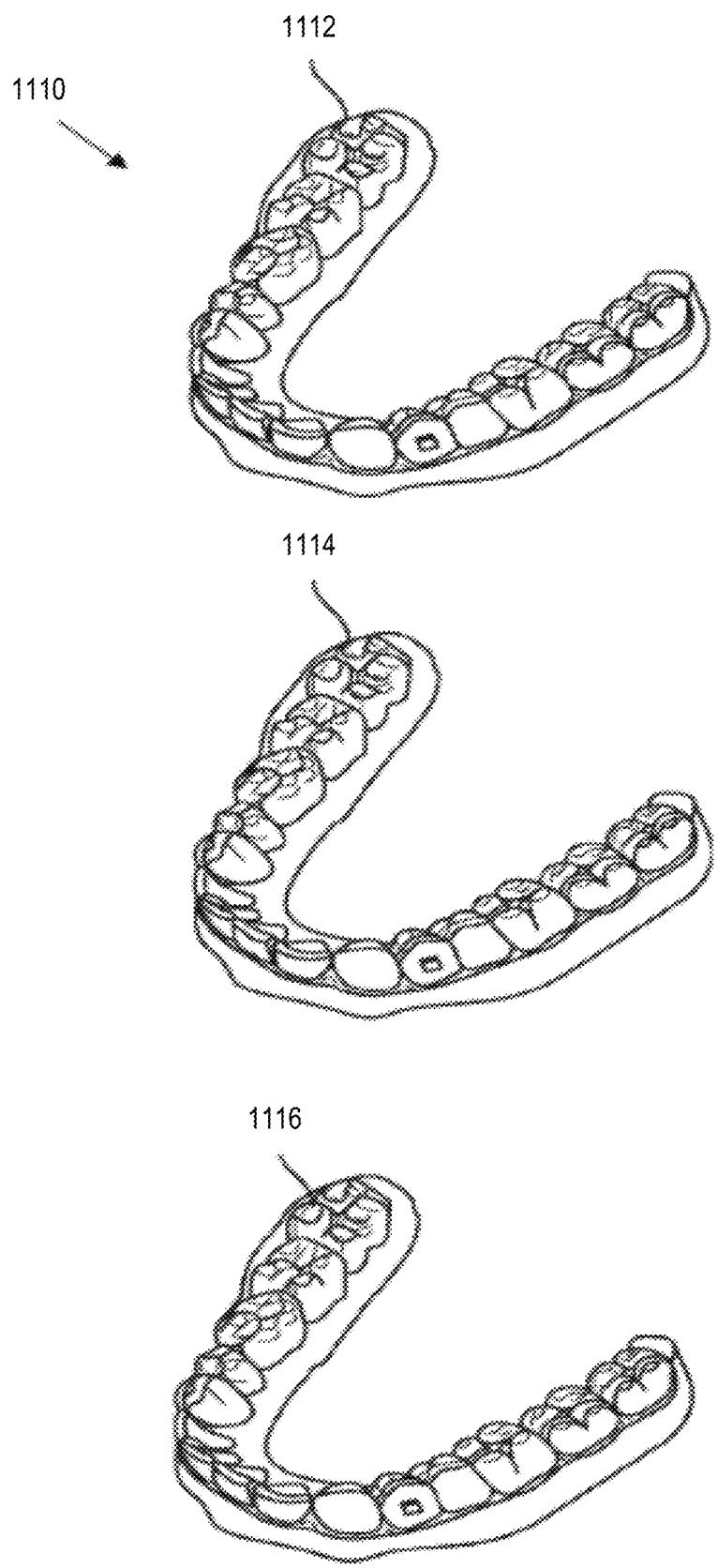
FIG. 11B illustrates a tooth repositioning system, in accordance with embodiments.

FIG. 11B illustrates a tooth repositioning system 1110 including a plurality of appliances 1112, 1114, and 1116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1110 can include a first appliance 1112 corresponding to an initial tooth arrangement, one or more intermediate appliances 1114 corresponding to one or more intermediate arrangements, and a final appliance 1116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 1112, 1114, 1116, or portions thereof, can be produced using indirect fabrication techniques, such as thermoforming over a positive or negative mold, which may be inspected using the methods and systems described herein above. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be formed by a rapid prototyping machine (e.g., an SLA 3D printer). The rapid prototyping machine may receive digital models of molds of dental arches and/or digital models of the appliances 1112, 1114, 1116 after the digital models of the appliances 1112, 1114, 1116 have been processed by processing logic of a computing device. The processing logic may include hardware (e.g., circuitry, dedicated logic, programming logic, microcode, etc.), software (e.g., instructions executed by a processing device), firmware, or a combination thereof.

To manufacture the molds, a shape of a dental arch for a patient at a treatment stage is determined based on a treatment plan. In the example of orthodontics, the treatment plan may be generated based on an intraoral scan of a dental arch to be molded. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting technologies (e.g., to design the virtual 3D mold). Alternatively, an initial negative mold may be generated from an actual to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model will be different. The original virtual 3D model, the final virtual model 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models. One or more of the virtual 3D models may include representations of attachments on one or more teeth. One or more attachment devices may be manufactured (e.g., using rapid prototyping machines) in order to accurately place the one or more attachments to the one or more teeth.

Each virtual 3D model of a patient's dental arch may be used to generate customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specific geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances SLA is used to fabricate an SLA mold. In SLA, the mold is fabricated by successively printing thin layers of a photo-curable material (e.g., a polymeric resin) on top of one another. A platform rests in a bath of liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 1112, 1114, and 1116 can be pressure formed or thermoformed over the molds. Each mold may be used to fabricate an appliance that will apply forces to the patient's teeth at a particular stage of the orthodontic treatment. The appliances 1112, 1114, and 1116 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell.

Additional information may be added to the appliance. The additional information may be any information that pertains to the aligner. Examples of such additional information includes a part number identifier, patient name, a patient identifier, a case number, a sequence identifier (e.g., indicating which aligner a particular liner is in a treatment sequence), a date of manufacture, a clinician name, a logo and so forth. For example, after an appliance is thermoformed, the aligner may be laser marked with a part number identifier (e.g., serial number, barcode, or the like). In some embodiments, the system may be configured to read (e.g., optically, magnetically, or the like) an identifier (barcode, serial number, electronic tag or the like) of the mold to determine the part number associated with the aligner formed thereon. After determining the part number identifier, the system may then tag the aligner with the unique part number identifier. The part number identifier may be computer readable and may associate that aligner to a specific patient, to a specific stage in the treatment sequence, whether it is an upper or lower shell, a digital model representing the mold the aligner was manufactured from and/or a digital file including a virtually generated digital model or approximated properties thereof of that aligner (e.g., produced by approximating the outer surface of the aligner based on manipulating the digital model of the mold, inflating or scaling projections of the mold in different planes, etc.).

After an appliance is formed over a mold for a treatment stage, that appliance is subsequently trimmed along a cutline (also referred to as a trim line) and the appliance may be removed from the mold. The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, the orthodontic appliances herein (or portions thereof) can be produced using direct fabrication, such as additive manufacturing techniques (also referred to herein as "3D printing") or subtractive manufacturing techniques (e.g., milling).

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Material properties may vary depending on the properties of raw materials, purity of raw materials, and/or process variables during mixing of the raw materials. In many embodiments, resins or other materials should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the apparatuses described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 12:
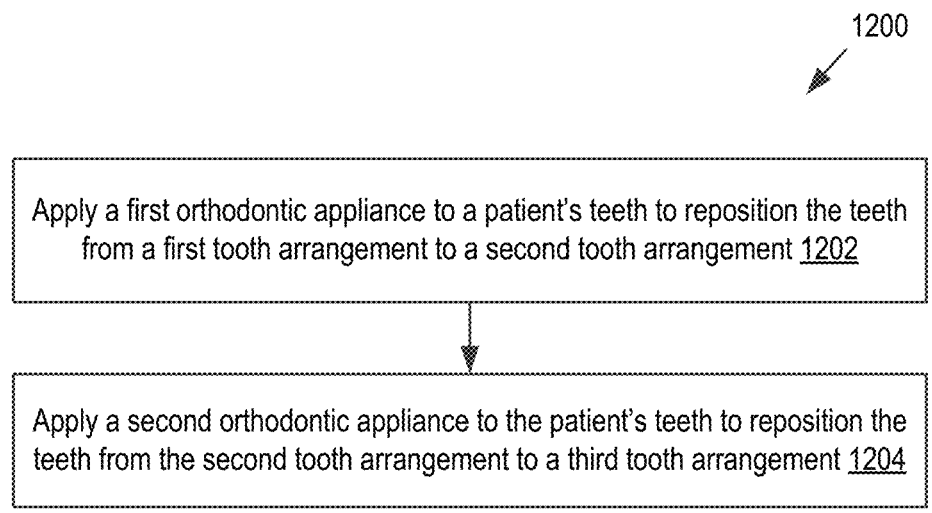
FIG. 12 illustrates an example method of orthodontic treatment using a plurality of appliances, in accordance with embodiments.

FIG. 12 illustrates a method 1200 of orthodontic treatment using a plurality of appliances, in accordance with embodiments. The method 1200 can be practiced using any of the appliances or appliance sets described herein. In block 1202, a first orthodontic appliance is applied to a patient's teeth in order to reposition the teeth from a first tooth arrangement to a second tooth arrangement. In block 1204, a second orthodontic appliance is applied to the patient's teeth in order to reposition the teeth from the second tooth arrangement to a third tooth arrangement. The method 1200 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 13:
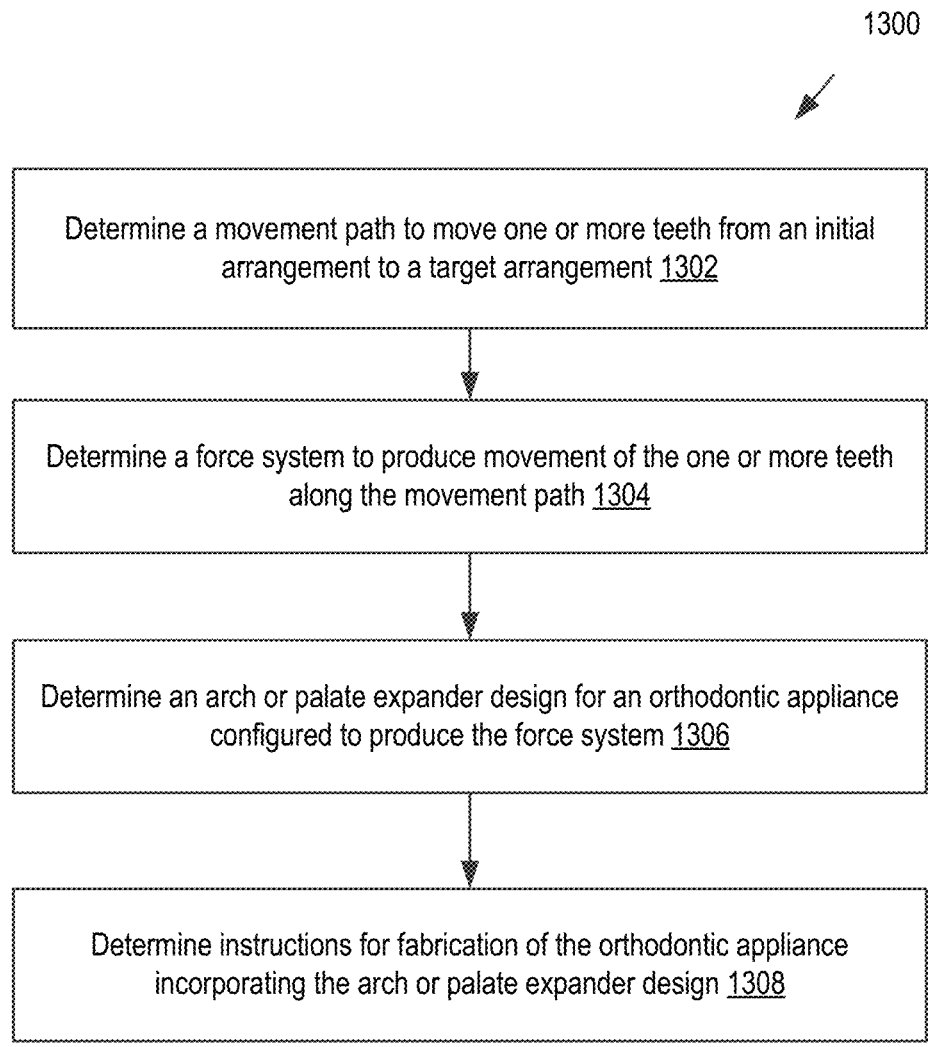
FIG. 13 illustrates an example method for designing an orthodontic appliance to be produced by direct fabrication, in accordance with embodiments.

FIG. 13 illustrates a method 1300 for designing an orthodontic appliance to be produced by direct fabrication, in accordance with embodiments. The method 1300 can be applied to any embodiment of the orthodontic appliances described herein. Some or all of the blocks of the method 1300 can be performed by any suitable data processing system or device, e.g., one or more processors configured with suitable instructions.

In block 1302, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1304, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 1306, an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like.

Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1308, instructions for fabrication of the orthodontic appliance incorporating the orthodontic appliance are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 1300 may comprise additional blocks: 1) The upper arch and palate of the patient is scanned intraorally to generate three dimensional data of the palate and upper arch; 2) The three dimensional shape profile of the appliance is determined to provide a gap and teeth engagement structures as described herein.

Although the above blocks show a method 1300 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 1400 may be performed with any suitable fabrication system or device, such as the embodiments described herein. Some of the blocks may be optional, and the order of the blocks can be varied as desired.

Figure 14:
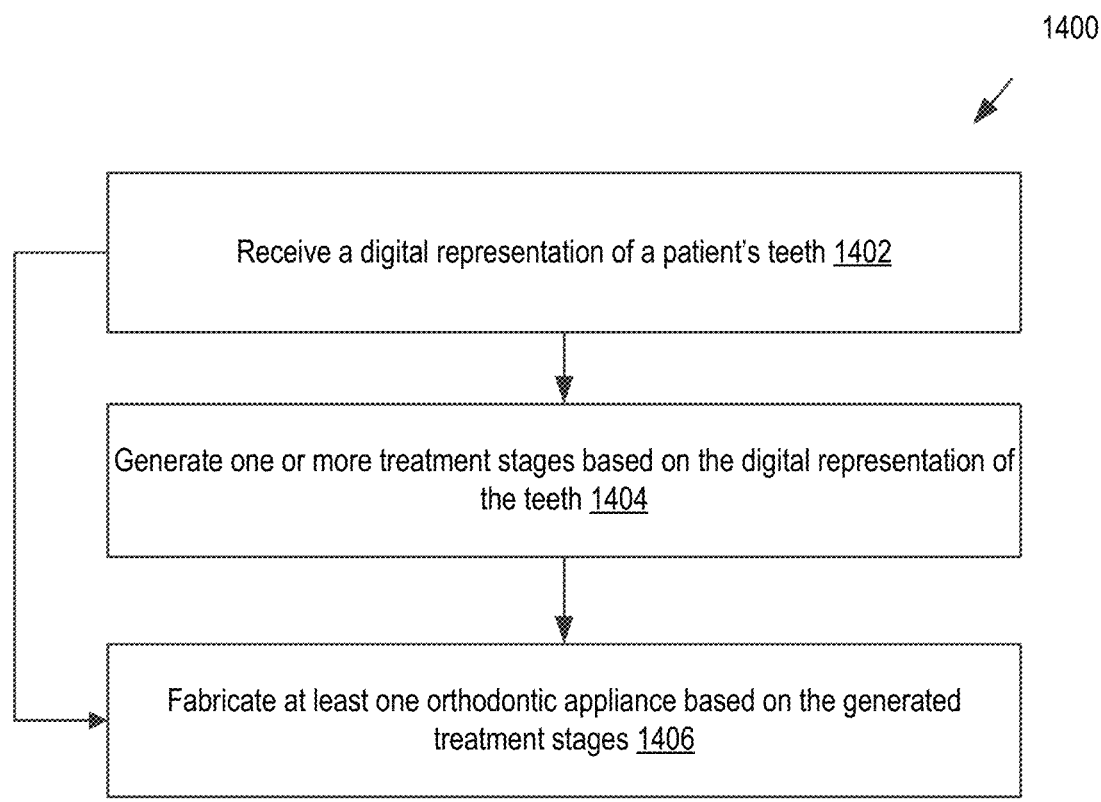
FIG. 14 illustrates an example method for digitally planning an orthodontic treatment, in accordance with embodiments.

FIG. 14 illustrates a method 1400 for digitally planning an orthodontic treatment and/or design or fabrication of an appliance (e.g., an orthodontic aligner or an attachment placement appliance), in accordance with embodiments. The method 1400 can be applied to any of the treatment procedures described herein and can be performed by any suitable data processing system.

In block 1402, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1404, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1406, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. Design and/or fabrication of an orthodontic appliance, and perhaps a particular orthodontic treatment, may include use of a representation of the patient's teeth (e.g., receive a digital representation of the patient's teeth), followed by design and/or fabrication of an orthodontic appliance based on a representation of the patient's teeth in the arrangement represented by the received representation.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of forming a dental apparatus, the method comprising:
fabricating the dental apparatus from a resin using an additive fabrication process, wherein the dental apparatus comprises:
a body shaped to contact and conform to at least a portion of a dental arch; and
one or more concave surfaces disposed along the body, wherein at least one of the one or more of the concave surfaces comprises an aperture formed therethrough, wherein at least one of the concave surfaces comprising an aperture further comprises at least one channel formed therein that is radially oriented with respect to the aperture, and wherein the at least one channel facilitates flow of residual resin toward the aperture; and
centrifuging the dental apparatus using parameters sufficient to remove the residual resin from surfaces of the dental apparatus resulting from the additive fabrication process, wherein each aperture provides a flow path for the residual resin during the centrifugation so as to reduce or eliminate pooling of the residual resin on a respective concave surface of the dental apparatus.

2. The method of claim 1, wherein the dental apparatus is in condition for use in a dental procedure without an intermediate solvent-based cleaning step after the centrifuging and before the use in the dental procedure.

3. The method of claim 1, further comprising:
cleaning the dental apparatus with a solvent to further remove residual resin not removed by the centrifuging, wherein an amount of solvent used is less than an amount of solvent sufficient for cleaning a similar dental apparatus that does not have any apertures through any concave surfaces.

4. The method of claim 1, further comprising:
orienting the dental apparatus on a rotor of a centrifuge chamber such that the one or more concave surfaces are substantially facing a center of mass of the rotor during the centrifuging.

5. The method of claim 1, wherein, during the centrifuging, the dental apparatus is attached to a build plate used for fabricating the dental apparatus.

6. The method of claim 5, wherein centrifuging the dental apparatus comprises:
arranging the dental apparatus and build plate such that, during the centrifuging, a normal direction of the build plate is oriented substantially parallel to a radial direction that passes through a center of mass of a centrifuge rotor.

7. The method of claim 5, wherein centrifuging the dental apparatus comprises:
arranging the dental apparatus and build plate such that, during the centrifuging, a normal direction of the build plate is oriented at a non-zero angle with respect to a radial axis that passes through a center of mass of a centrifuge rotor.

8. The method of claim 7, wherein the non-zero angle is from about 10° to about 35°.

9. The method of claim 1, wherein at least one aperture is in a form of a round aperture, an elliptical aperture, or a mesh.

10. The method of claim 1, wherein at least one of the concave surfaces comprises two or more apertures formed therethrough.

11. The method of claim 1, wherein a maximum diameter of at least one aperture is from about 0.5 millimeters to about 5 millimeters.

12. The method of claim 1, wherein the dental apparatus is formed from a polymer selected from a group consisting of a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, and a combination thereof.

13. The method of claim 1, wherein the dental apparatus is a retainer, wherein the one or more concave surfaces are configured to engage the dental arch, and wherein the retainer comprises at least one aperture formed through a concave surface in a central region of the retainer.

14. The method of claim 1, wherein the dental apparatus is an aligner, wherein the one or more concave surfaces are configured to engage teeth along the dental arch, and wherein the aligner comprises at least one aperture formed through a concave surface shaped to substantially conform to a tooth when worn by a patient.

* * * * *